(12) United States Patent
Bartek et al.

(10) Patent No.: US 10,323,193 B2
(45) Date of Patent: *Jun. 18, 2019

(54) DISCRIMINATE MASS TRANSFER IN A WET OXIDATION SYSTEM

(71) Applicant: CIRIS ENERGY, INC., Centennial, CO (US)

(72) Inventors: Robert Bartek, Centennial, CO (US); Bahman Rejai, Centennial, CO (US)

(73) Assignee: CIRIS ENERGY, INC., Centennial, CO (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/012,063

(22) Filed: Jun. 19, 2018

(65) Prior Publication Data

US 2018/0298286 A1    Oct. 18, 2018

Related U.S. Application Data

(63) Continuation of application No. 15/556,937, filed as application No. PCT/US2016/021990 on Mar. 11, 2016, now Pat. No. 10,023,807.

(Continued)

(51) Int. Cl.
*C10G 1/00* (2006.01)
*C02F 3/30* (2006.01)
(Continued)

(52) U.S. Cl.
CPC .......... *C10G 1/00* (2013.01); *B01D 53/0454* (2013.01); *C02F 3/30* (2013.01); *C02F 11/08* (2013.01); *C10G 3/00* (2013.01); *C10G 3/40* (2013.01); *C10G 3/42* (2013.01); *C10G 3/60* (2013.01); *D21C 5/005* (2013.01); *D21H 11/10* (2013.01);
(Continued)

(58) Field of Classification Search
None
See application file for complete search history.

(56) References Cited

U.S. PATENT DOCUMENTS 3,524,893 A * 8/1970 Ware, Jr. .............. C07C 29/52
568/840
6,436,158 B1    8/2002 Fujikawa et al.
(Continued)

FOREIGN PATENT DOCUMENTS

CA    1197729 A    12/1985
WO    WO2010107153 A1    9/2010
WO    WO2014185957 A1    11/2014

OTHER PUBLICATIONS

European Search Report; dated Aug. 2, 2018 for EP App. No. 16762591.2.
(Continued)

*Primary Examiner* — Tam M Nguyen
(74) *Attorney, Agent, or Firm* — Mendelsohn Dunleavy, P.C.

(57) ABSTRACT

A method for treatment of a lignocellulosic biomass using an oxidizing agent selected from an oxygen-containing gas, hydrogen peroxide, ozone and oxidizing acids. The treatment products may be subjected to microbial digestion in order to generate one or more desirable products from the carbonaceous feedstock. The solid portion of the reaction products may be further processed to be used in the paper industry.

24 Claims, 4 Drawing Sheets

Related U.S. Application Data

(60) Provisional application No. 62/139,349, filed on Mar. 27, 2015, provisional application No. 62/132,248, filed on Mar. 12, 2015.

(51) Int. Cl.
    *C10G 3/00*         (2006.01)
    *B01D 53/04*       (2006.01)
    *C02F 11/08*       (2006.01)
    *D21C 5/00*        (2006.01)
    *D21H 11/10*      (2006.01)

(52) U.S. Cl.
    CPC ............... *C10G 2300/1003* (2013.01); *C10G 2300/1011* (2013.01); *Y02E 50/32* (2013.01); *Y02P 30/20* (2015.11)

(56) References Cited

U.S. PATENT DOCUMENTS

| | | | |
|---|---|---|---|
| 8,501,011 B2 | 8/2013 | Felch | |
| 8,563,791 B2 | 10/2013 | Anderson et al. | |
| 2006/0060541 A1 | 3/2006 | Abazajian | |
| 2010/0139913 A1 | 6/2010 | Downey | |
| 2010/0262987 A1 | 10/2010 | Imanilov | |
| 2011/0201854 A1* | 8/2011 | Kocal | C10G 3/45 585/240 |
| 2011/0232161 A1* | 9/2011 | Siskin | C10L 1/04 44/307 |
| 2011/0308790 A1* | 12/2011 | Strapoc | C09K 8/582 166/250.01 |
| 2013/0079566 A1 | 3/2013 | Lin | |
| 2013/0232853 A1 | 9/2013 | Peterson et al. | |
| 2013/0341569 A1 | 12/2013 | Ampulski et al. | |
| 2014/0114105 A1* | 4/2014 | Vermeiren | C11B 3/06 585/321 |
| 2015/0051428 A1* | 2/2015 | Dayton | C10B 53/02 585/242 |
| 2015/0073188 A1* | 3/2015 | Floudas | C10G 29/205 585/332 |
| 2015/0073197 A1* | 3/2015 | Jasra | C07C 7/12 585/824 |
| 2015/0099868 A1* | 4/2015 | Yang | C08H 6/00 530/503 |
| 2016/0060190 A1* | 3/2016 | Trucko | C07C 7/005 585/802 |

OTHER PUBLICATIONS

Singapore Search Report and Written Opinion; dated Jul. 24, 2018 for SG Application No. 11201707424Y.
International Search Report and Written Opinion; dated Jul. 25, 2016 for PCT Application No. PCT/US2015/021990.
Stamm, Alfred J. "Shrinking and swelling of wood." Industrial & Engineering Chemistry 27.4 (1935): 401-406.
Hermans, P. H., and A. Weidinger. "X-ray studies on the crystallinity of cellulose." Journal of Polymer Science Part A: Polymer Chemistry 4.2 (1949): 135-144.
Bergh, Jacobus J., et al. "Non-catalytic oxidation of water-slurried coal with oxygen: identification of fulvic acids and acute toxicity." Fuel 76.2 (1997): 149-154.
Somasundaran, P., Lei Zhang, and D. W. Fuerstenau. "The effect of environment, oxidation and dissolved metal species on the chemistry of coal flotation." International journal of mineral processing 58.1 (2000): 85-97.
Stärk, Kerstin, et al. "Oxidative depolymerization of lignin in ionic liquids." ChemSusChem 3.6 (2010): 719-723.
Zhu, Yongming. "Overview of Biomass Pretreatment Technologies." Retrieved on Dec. 26, 2011: 2012; pp. 1-10.
Notice of Allowance and Fee(s) Due; dated Mar. 23, 2018 for U.S. Appl. No. 15/556,937.
Supplemental Notice of Allowance; dated Apr. 6, 2018 for U.S. Appl. No. 15/556,937.

* cited by examiner

DISCRIMINATE MASS TRANSFER IN A WET OXIDATION SYSTEM

RELATED APPLICATION INFORMATION

This application is a continuation application of U.S. patent application Ser. No. 15/556,937 filed on Sep. 8, 2017, now U.S. Pat. No. 10,023,807, which is a 371 continuation of international application no. PCT/US2016/021990 filed on Mar. 11, 2016, designating the United States of America, now expired, which claims the benefit of U.S. provisional application Nos. 62/132,248 filed on Mar. 12, 2015 and 62/139,349 filed on Mar. 27, 2015.

FIELD OF THE INVENTION

The present invention relates to conversion of insoluble carbonaceous feedstocks to water soluble organic molecules. In particular, the present invention is directed to a wet oxidation process for treatment of carbonaceous feedstocks to produce water soluble organic molecules and/or biodegradable substrates.

DESCRIPTION OF THE RELATED TECHNOLOGY

Due to energy prices and environmental concerns, various carbonaceous materials, especially those that have previously been considered less suitable for use as fuel, have received renewed attention. These carbonaceous materials may be processed to generate products ranging from fuels to raw materials for various industries. Such products include natural gas, hydrogen, methanol, organic acids, and long chain hydrocarbons. For example, carbonaceous materials can be gasified at elevated temperature and pressure to produce a synthesis gas stream that can subsequently be converted to gaseous fuel.

Technologies that convert coal as a carbonaceous feedstock to valuable liquid fuels and chemicals have been described extensively in the prior art. These technologies fall into three main categories: hydroliquefaction or direct liquefaction, pyrolysis and gasification. In these processes, coal is depolymerized to varying degrees to produce smaller organic compounds with or without oxygen and/or water. The goal of these technologies is coal beneficiation by providing a mixture of higher value fuels or chemicals or precursors for desirable fuels or chemicals. However, these processes typically require high temperatures, pressures and/or they require expensive hydrogen and organic solvents.

Wet air oxidation is generally carried out under relatively mild conditions. This technology has been widely used in wastewater treatment. Wet air oxidation can remove organic components from wastewater by oxidation of dissolved or suspended organic components using oxygen as an oxidizing agent. The treated wastewater is substantially devoid of organic components and is thus ready to be returned to the environment. Wastewater treatment by wet air oxidation is typically conducted in the presence of excess air to ensure complete oxidation of the organic components in the wastewater to carbon dioxide.

US 2006/0060541 discloses a waste treatment method for disposal of waste containing organic components. The method subjects the waste to wet oxidation or wet air oxidation, followed by introduction of the treated waste mixture into a disposal well or injection of the treated waste mixture into a geological formation. The treated waste mixture may be filtered prior to injection. A catalyst may be used in the oxidation process, which catalyst may be a copper salt, manganese salt, iron, a strong acid oxidizer, or a nitric or nitrous group.

U.S. Pat. No. 8,501,011 discloses a method for treating wastewater streams. The method uses a wet oxidation process in the presence of a catalyst at elevated temperature and pressure for oxidizing undesirable organic components in the wastewater stream. The method includes contacting the wastewater stream with a copper catalyst and an oxidizing agent at an elevated temperature and superatmospheric pressure at a pH below about 2 or above about 13 in a wet oxidation reactor to form an oxidized aqueous mixture, precipitating at least a portion of the catalyst by adjusting the pH level of the oxidized aqueous mixture to form a precipitated catalyst, and recycling at least a portion of the precipitated catalyst.

Wet air oxidation has also been proposed for use in solubilizing carbonaceous materials such as coal. U.S. Pat. No. 4,891,132 discloses a process for producing liquid hydrocarbons from oil shale by wet oxidation. The process comprises: (a) contacting (1) a reaction mixture of an aqueous slurry of comminuted oil shale containing pyritic sulfur and (2) an oxidizing gas with sufficient agitation at oxidation conditions and at a temperature of about 275° F. to about 325° F. to provide a product mixture, (b) separating treated shale solids from the liquid portion of the product mixture, and (c) recovering liquid hydrocarbons from the liquid phase of the product mixture.

U.S. Pat. No. 8,563,791 discloses a process of solubilizing organic solids by reacting the organic solids with an oxidizing agent in superheated water to form a solubilized organic solid. The oxidizing agent is preferably pure, undiluted molecular oxygen. However, pure oxygen is not only costly, but can be dangerous. The process is performed in reactors with no headspace to reduce the risk. A small accumulation of a flammable gas like methane or hydrogen, which will be released in a thermal cracking process, with oxygen in the headspace of a reactor can explode at the process temperature.

Jacobus J. Bergh et al., *Non-catalytic oxidation of water-slurried coal with oxygen: identification of fulvic acids and acute toxicity Origin*, 76 FUEL, 149-154 (1997) describes a process for aqueous oxidation of coal with oxygen to convert about 8% of the coal to fulvic acids. The process is conducted at a temperature of 180° C. and a pressure of 600 psig for a reaction time of 1 hour.

Thus, the prior art discloses both catalytic and non-catalytic wet air oxidation for the treatment of carbon-containing products in an aqueous environment, such as waste water that contains soluble organics from various industrial processes. The objective of some of these technologies is near-complete oxidation of these soluble organics to carbon dioxide to achieve a contaminant-free discharge. Other researchers or groups have attempted to apply this same technology for the depolymerization of numerous organic polymers and other compounds, such as whole biomass, fractionated biomass, lignite, and low rank coals, and sugar, to produce various oxygenated organics, such as alcohols, ketones, aldehydes, carboxylic acids, monomeric sugars, polysaccharides, humic and fulvic acids.

The reaction mechanism is a free radical process initiated by the dissociation of diatomic oxygen and its insertion into the polymer. It is sequential in nature in the sense that oxygen reacts with the starting material as well as the products of the initial reaction between the oxygen and the starting material and this typically results in poor economic performance. This is because such processes fail to achieve significant conversion of the starting material unless the processes are conducted in a manner that results in high yields of low molecular weight water soluble products that are of little commercial value. Typically, at higher conversion levels, large amounts of carbon dioxide are produced along with heat as a result of complete oxidation of carbon and hydrogen and other components. This results in relatively low yields of the desired products and also makes the cost of separating the diluted desirable products from the undesirable product uneconomical.

It is clear that oxygen partial pressure and reaction temperature are significant driving forces in causing 1) the slower oxygen insertion and oxidative cracking of the carbonaceous material in the feedstock to small molecules of commercial value, and 2) the more rapid and complete oxidation of the soluble intermediates released from the feedstock by their interaction with oxygen to form carbon dioxide. Attaining high rates and deep conversion of the feedstock within reasonable residence times by elevating reaction temperature and using higher oxygen partial pressure will just exacerbates this combustion of soluble intermediates to carbon dioxide. There is simply a direct competition for the oxygen dissolved or dispersed in the liquid phase; as mass transfer is from the gas phase into the liquid and then to the solid feedstock (which may produce oxide species from the interaction of feedstock solid and oxygen). On the other hand, reducing reaction harshness by lowering reaction temperature or oxygen partial pressure will reduces the total conversion of the feedstock to small molecules of commercial value in a unit time, but does not significantly change the selectivity of products formed, thus carbon dioxide formation is still higher than desired. The loss of feedstock to carbon dioxide is even worse when stronger oxidizing agents, such as pure oxygen, peroxides, etc, are used.

The present invention has discovered that it is desirable to significantly change the dynamics of the oxidation of the feedstock in order to raise the rate of oxygen mass transfer to the solid feedstock, while at the same time reduce the interaction of oxygen with the soluble intermediates in the aqueous phase. Thermal or free radical quenching or ultra-short liquid residence times have been suggested by others, but these are not economically attractive or result in significant gains in process yields. Since oxygen transfers by colliding with either feedstock or the intermediates by its solubilization and diffusion through the aqueous phase, the present invention devises a process to raise the probability for oxygen's interactions with the solid feedstock while reduce the interaction with the intermediates that are dissolved in the liquid phase. The process of the present invention increases the extent of feedstock conversion and reduces the probabilities of reacting oxygen with the intermediates.

Further, traditional wet air oxidation processes are not suitable for treating carbonaceous materials to produce soluble organic molecules that may be used by microorganisms. As discussed above, wet air oxidation typically converts a majority, if not all, of the organic components in a carbonaceous material to $CO_2$, leaving only a small amount of soluble organic molecules that are suitable as a feedstock for microorganisms. The present invention provides an improved wet air oxidation process that substantially diminishes $CO_2$ production and enhances production of soluble organic molecules from the carbonaceous materials. In this manner, a significantly larger proportion of soluble organic molecules suitable as a feedstock for microorganisms is obtained.

It has also been found that the present invention can be employed to provide a raw material stream suitable for use in the paper industry. There are several classes of pulping techniques which are known and in general commercial use. The simplest of these techniques is the so-called refiner mechanical pulping (RMP) method, in which the input lignocellulosic biomass is ground or abraded in water by a mechanical milling operation until the fibers are of a defined or desired state. Other pulping methods include thermo-mechanical pulping (TMP), chemical treatment with thermo-mechanical pulping (CTMP), chemi-mechanical pulping (CMP), and the kraft or sulfate process.

Cellulose fibers are desired for paper production. The second most abundant polymer in native wood is lignin, which is an undesirable component for paper making. In native wood, lignin physically protects cellulose fibers in complexes known as lignocellulosics that must be disrupted and separated from the cellulose fibers in order to release the cellulose fiber for paper making. The goal of pulping is to break down the lignin seal and disrupt the crystalline structure of the lignocellulosic material.

A large amount of electrical energy or costly and environmentally unfriendly chemicals are required by for typical commercial pulping processes. In particular, high energy inputs are generally required to separate cellulose fibers from other components of woods rich in lignin as pulping of such woods typically require extended refining periods and high temperatures and/or pressures.

SUMMARY OF THE INVENTION

The present invention provides a method for treating a carbonaceous feedstock. In the method, at least one oxidizing agent selected from an oxygen-containing gas, hydrogen peroxide, ozone and oxidizing acids is adsorbed from a liquid phase of an aqueous mixture comprising water, the at least one oxidizing agent and the carbonaceous feedstock, onto the carbonaceous feedstock under conditions at which substantially no oxidation of the carbonaceous feedstock will occur in order to produce an aqueous mixture with the liquid phase having a reduced content of the oxidizing agent and a carbonaceous feedstock having oxidizing agent adsorbed on a surface thereof. The carbonaceous feedstock with adsorbed oxidizing agent is then heated in an aqueous mixture having a liquid phase that contains a low content of oxidizing agent to a temperature and for a sufficient time to oxidize at least a portion of the carbonaceous feedstock.

In another aspect, the method of the present invention includes multiple heating steps, each of which preferably is conducted using at least one different condition selected from temperature, pressure, duration, or using a different oxidizing agent.

In yet another aspect, the method of the present invention at least one catalyst is present in the aqueous mixture during at least one of the heating steps.

In another aspect, the method of the present invention is conducted with at least one solubilizing agent in the aqueous mixture during at least one of the heating steps.

In another aspect, the method of the present invention the aqueous mixture is provided by mixing an oxidizing agent and a suspension of carbonaceous material in water.

In yet another aspect, the method of the present invention the aqueous mixture is provided by mixing a suspension of carbonaceous material with an aqueous solution of the oxidizing agent.

In yet another aspect, the method of the present invention further comprises the steps of: chemical and/or physical separation of the product of the one or more heating steps; and/or microbial digestion of the product of the one or more heating steps.

DETAILED DESCRIPTION OF THE PREFERRED EMBODIMENT(S)

Figure 1:
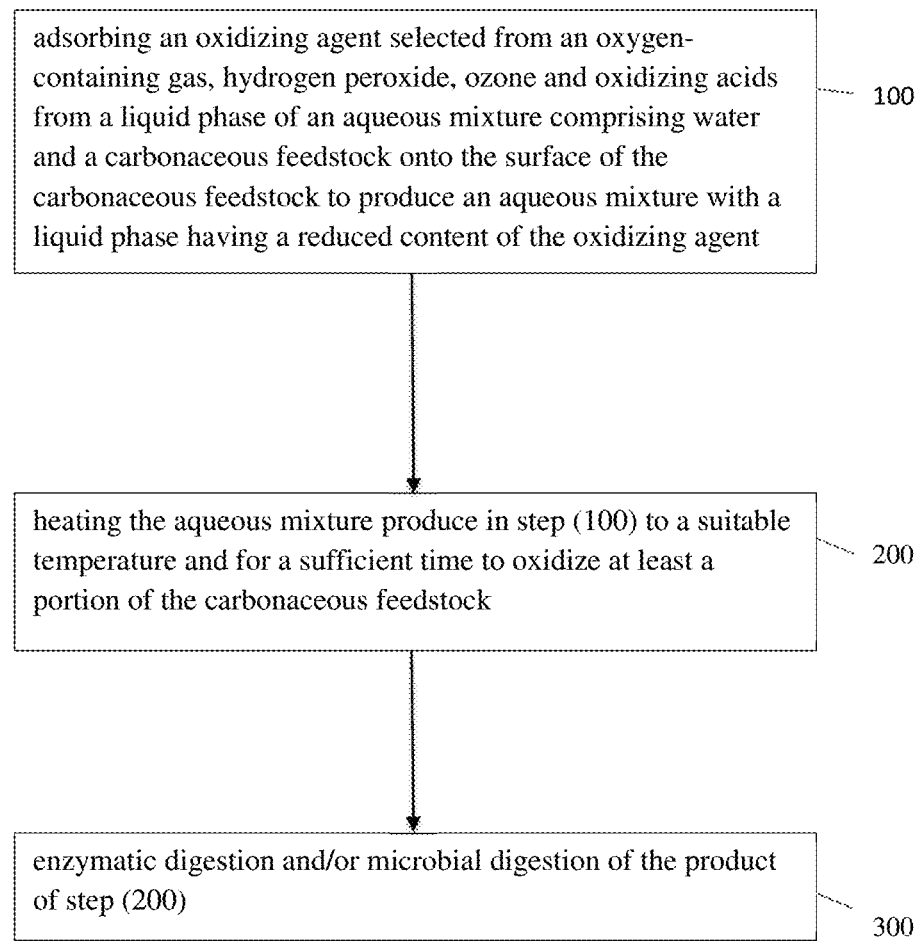
FIG. 1 is a flow chart that shows a method according to one embodiment of the present invention.

For illustrative purposes, the principles of the present invention are described by referencing various exemplary embodiments. Although certain embodiments of the invention are specifically described herein, one of ordinary skill in the art will readily recognize that the same principles are equally applicable to, and can be employed in other systems and methods. Before explaining the disclosed embodiments of the present invention in detail, it is to be understood that the invention is not limited in its application to the details of any particular embodiment shown. Additionally, the terminology used herein is for the purpose of description and not of limitation. Furthermore, although certain methods are described with reference to steps that are presented herein in a certain order, in many instances, these steps may be performed in any order as may be appreciated by one skilled in the art; the novel method is therefore not limited to the particular arrangement of steps disclosed herein.

It must be noted that as used herein and in the appended claims, the singular forms "a", "an", and "the" include plural references unless the context clearly dictates otherwise. Furthermore, the terms "a" (or "an"), "one or more" and "at least one" can be used interchangeably herein. The terms "comprising", "including", "having" and "constructed from" can also be used interchangeably.

Unless otherwise indicated, all numbers expressing quantities of ingredients, properties such as molecular weight, percent, ratio, reaction conditions, and so forth used in the specification and claims are to be understood as being modified in all instances by the term "about," whether or not the term "about" is present. Accordingly, unless indicated to the contrary, the numerical parameters set forth in the specification and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements.

It is to be understood that each component, compound, substituent, or parameter disclosed herein is to be interpreted as being disclosed for use alone or in combination with one or more of each and every other component, compound, substituent, or parameter disclosed herein.

It is also to be understood that each amount/value or range of amounts/values for each component, compound, substituent, or parameter disclosed herein is to be interpreted as also being disclosed in combination with each amount/value or range of amounts/values disclosed for any other component(s), compounds(s), substituent(s), or parameter(s) disclosed herein and that any combination of amounts/values or ranges of amounts/values for two or more component(s), compounds(s), substituent(s), or parameters disclosed herein are thus also disclosed in combination with each other for the purposes of this description.

It is further understood that each lower limit of each range disclosed herein is to be interpreted as disclosed in combination with each upper limit of each range disclosed herein for the same component, compounds, substituent, or parameter. Thus, a disclosure of two ranges is to be interpreted as a disclosure of four ranges derived by combining each lower limit of each range with each upper limit of each range. A disclosure of three ranges is to be interpreted as a disclosure of nine ranges derived by combining each lower limit of each range with each upper limit of each range, etc. Furthermore, specific amounts/values of a component, compound, substituent, or parameter disclosed in the description or an example is to be interpreted as a disclosure of either a lower or an upper limit of a range and thus can be combined with any other lower or upper limit of a range or specific amount/value for the same component, compound, substituent, or parameter disclosed elsewhere in the application to form a range for that component, compound, substituent, or parameter.

As used herein, the term "bioconversion" refers to the conversion of carbonaceous materials into a product that may include methane and other useful gases and liquid components by a microorganism. The product of bioconversion includes, but is not limited to, organic materials such as hydrocarbons, for example, methane, ethane, propane, butane, and other small oxygenated organic compounds, such as fatty acids, dicarboxylic acids, aldehydes, ketones, and alcohols that are useful as fuels or chemicals or in the production of fuels or chemicals, and inorganic materials, such as gases, including hydrogen and carbon dioxide.

As used herein, the term "carbonaceous feedstock" includes naturally occurring polymeric substances, such as coal, lignite, tar sands, tars, crude oils, peat, pitch, resins, lignin, latex rubber, waxes, agricultural wastes, bark, wood, any type of renewable biomass and other products from trees, algae cake, and other recalcitrant organic matter, and may also include lower-valued by-products from petroleum refining and chemical manufacturing, such as crude oil atmospheric bottoms, crude oil vacuum residues, residua from fluid catalytic cracking, petroleum coke, coker and other thermal cracking gas oils and bottoms, raffinates, asphalts, polynuclear aromatics, and the like, and may even include synthetic polymer wastes such as polyethylene, polypropylene, polystyrene, polyesters, polyacrylics, and the like.

In one embodiment of the present invention, the carbonaceous feedstock comprises coal, lignite, tar sands, tars, crude oils, peat, pitch, resins, lignin, latex rubber, waxes, agricultural wastes, biomass wastes, grown for purpose biomass, bark, wood, forestry wastes, sawdust, municipal solid waste, waste plastics, lignocellulosic biomasses, grasses, palm oil wastes, and algae concentrate. Algae concentrate, such as algae paste or algae cake, is a residue to obtained by separating algae from the medium in which it grows, which is typically water based. The concentrated algae may be able to be processed in a form containing a small amount of residual water. The algae may be separated from the medium in a variety of ways, for example, by filtration.

As used herein, the term "lignocellulosic biomass" refers to plant biomass that is composed of or contains at least cellulose, hemicellulose, and lignin. The carbohydrate polymers (cellulose and hemicelluloses) are typically tightly bound to the lignin. Lignocellulosic biomass can be grouped into four main categories: (1) agricultural residues including, for example, corn stover and sugarcane bagasse, (2) dedicated energy crops, (3) wood residues including sawmill and paper mill waste products, and (4) municipal paper waste. Cellulose, which is a β-glucan containing anhydro-D-glucose units, is the main structural component of plant cell walls and normally constitutes about 35-60% by weight (% w/w) of lignocellulosic biomass. Hemicellulose is a type of non-cellulosic polysaccharide associated with cellulose in plant tissues. Hemicellulose frequently constitutes about 20-35% w/w of lignocellulosic biomass, and the majority of hemicelluloses consist predominantly of polymers based on pentose units, such as D-xylose and D-arabinose units, although smaller proportions of hexose units, such as D-glucose and D-mannose units, are generally also present.

Examples of suitable lignocellulosic biomass for use in the present invention include both woody biomass and herbaceous biomass as well as dedicated energy crops. Specific examples of lignocellulosic biomass include, but are not limited to, Salix, Poplar, grasses such as *Eucalyptus*, grass (e.g., switch grass), *miscanthus*, sugar cane bagasse, stover (e.g., soybean stover, corn stover, etc.), rice straw, barley straw, wheat straw, chaff, hay, corn fiber, corn stover, corn cobs, grains such as corn grain, corn grind, cobs, stalks, corn husks, pectin, bagasse, rice hull, jute, wood from trees, wood fiber, wood chips, wood shavings, wood residues, slash or hog fuel from wood processing, forest residue, barks, bran, seeds, peels, fruit stones, shells, bagasse, weeds, aquatic plants leaves, saw dust, fiber waste, newspapers, office paper, cardboard, lignocellulose containing material of biological origin, such as some municipal or household wastes and combinations thereof. Biomass can also be provided by crops that can be harvested multiple times each year such as, for example, popular trees, *Miscanthus giganteus* and sugarcane, which is a source of the readily fermentable sucrose and the lignocellulosic side product bagasse.

As used herein, the term "coal" refers to any of the series of carbonaceous fuels ranging from lignite to anthracite. The members of the series differ from each other in the relative amounts of moisture, volatile matter, and fixed carbon they contain. Coal is comprised mostly of carbon, hydrogen, sulfur, oxygen, nitrogen and entrained water, predominantly in the form of large molecules having numerous carbon double bonds. Low rank coal deposits are mostly comprised of coal and water. Coal is a mineral deposit containing combustible substances which is considered to be a fossil fuel. Coal is formed from plants that have been fossilized through successive deoxidation and condensation processes.

As used herein, the term "heteroatom" means any atom besides hydrogen or carbon. Examples of heteroatoms include oxygen, nitrogen, phosphorus, sulfur, fluorine, and chlorine.

As used herein, the term "microorganism" includes bacteria, archaea and fungi. The microorganisms, for example, may include: Thermotogales, *Cytophaga* group, *Azospirillum* group, *Paracoccus* subgroup, *Sphingomonas* group, *Nitrosomonas* group, *Azoarcus* group, *Acidovorax* subgroup, *Oxalobacter* group, *Thiobacillus* group, *Xanthomonas* group, *Oceanospirillum* group, *Pseudomonas* and relatives, *Marinobacter hydrocarbonoclaticus* group, *Pseudoalteromonas* group, *Vibrio* subgroup, *Aeromonas* group, *Desulfovibrio* group, *Desulfuromonas* group, *Desulfobulbus* assemblage, *Campylobacter* group, *Acidimicrobium* group, *Frankia* subgroup, *Arthrobacter* and relatives, Nocardiodes subgroup, *Thermoanaerobacter* and relatives, *Bacillus megaterium* group, *Carnobacterium* group, *Clostridium* and relatives, and archaea such as Archaeoglobales, Methanobacteriales, Methanomicrobacteria and relatives, Methanopyrales, and Methanococcales.

More specific examples of microorganisms may include, for example, *Aerobacter, Aeromonas, Alcaligenes, Bacillus, Bacteroides, Clostridium, Escherichia, Klebsiella, Leptospira, Micrococcus, Neisseria, Paracolobacterium, Proteus, Pseudomonas, Rhodopseudomonas, Sarcina, Serratia, Streptococcus* and *Streptomyces, Methanobacterium omelianskii, Mb. Formicium, Mb. Sohngenii, Methanosarcina barkeri, Ms. Methanica, Mc. Masei, Methanobacterium thermoautotrophicum, Methanobacterium bryantii, Methanobrevibacter smithii, Methanobrevibacter arboriphilus, Methanobrevibacter ruminantium, Methanospirillum hungatei, Methanococcus vannielli, Methanothrix soehngenii, Methanothrix sp., Methanosarcina mazei, Methanosarcina thermophila*, Methanobacteriaceae, Methanosarcinaceae, Methanosaetaceae, Methanocorpusculaceae, Methaanomicrobiaceae, other archaea and any combination of these.

In some embodiments, the microorganisms are from the genera of *Acetobibrio, Acitothermus, Actinobacillus, Anaerobiospirillum, Anaerocellum, Anaeromyces, Aspergillus, Basfia, Butyrivibrio, Caldicellulosiruptor, Cellulomonas, Cellvibrio, Corynebacterium, Cytophaga, Erwinia, Fibobacter, Fibrobacter, Mannheimia, Neocallimastix, Orpinomyces, Paenibacillus, Pectobacterium, Piromonas, Prevotella, Prevotella, Rhodothermus, Ruminococcus, Ruminococcus, Saccharophagus, Sorangium, Sphaeromonas, Thermobifida, Thermotoga, Wolinella*, and *Zygosaccharomyces*. The microorganisms may be from the order of Actinomycetales, or from the family of Pasteurellaceae.

As used herein, the term "microorganism consortium" refers to a microorganism assemblage, containing two or more species or strains of microorganisms, and especially one in which each species or strain benefits from interaction with the other(s).

As used herein, the term "microorganism consortium" refers to a microorganism assemblage, containing two or more species or strains of microorganisms, and especially one in which each species or strain benefits from interaction with the other(s).

In some embodiments, the microorganisms may be pure strains. In some embodiments, the microorganisms may be genetically modified organisms, especially in making biogas from carbonaceous materials.

As used herein, the term "oxidizing acid" refers to an acid which also has oxidizing capabilities. Examples of oxidizing acids include hypochlorite acid, nitric acid, sulfuric acid, chloric acid, and perchloric acid.

As used herein, the term "oxygen-enriched air" refers to a mixture of gases with a composition comprising more oxygen than is present in air. Oxygen-enriched air has a composition including greater than about 21 vol. % oxygen, less than about 78 vol. % nitrogen, less than about 1 vol. % argon and less than about 0.04 vol. % carbon dioxide. In some embodiments, oxygen-enriched air comprises at least about 25 vol. % oxygen, or at least about 28 vol. % oxygen, or at least about 32 vol. % oxygen, or at least about 35 vol. % oxygen, or at least about 40 vol. % oxygen, or at least about 50 vol. % oxygen, or at least about 65 vol. % oxygen, or at least about 80 vol. % oxygen, or at least about 95 vol. % oxygen, or at least about 99 vol. % oxygen. The oxygen-enriched air may comprises no more than about 40 vol. % oxygen, or no more than about 50 vol. % oxygen, or no more than about 65 vol. % oxygen, or no more than about 80 vol. % oxygen, or no more than about 95 vol. % oxygen, or no more than about 99 vol. % oxygen.

The oxygen-enriched air is typically produced by mixing air with oxygen, thus enriching the oxygen in the air. The term "air" refers to a mixture of gases with a composition approximately identical to the native composition of gases taken from the atmosphere, generally at ground level. In some examples, air is taken from the ambient surroundings. Air has a composition that includes about 78 vol. % nitrogen, about 21 vol. % oxygen, about 1 vol. % argon, and about 0.04 vol. % carbon dioxide, as well as small amounts of other gases.

The phrase "oxygenated organic compound" refers to an organic compound that comprises at least one oxygen atom. Examples of the oxygenated organic compounds include oxygenated hydrocarbons, and oxygenated compounds comprising additional heteroatoms.

As used herein, the term "solubilizing" or "solubilized" refers to a process whereby the high molecular weight hydrocarbon molecules that comprise coal, biomass, or other carbonaceous material are reduced to much smaller hydrocarbon molecules or compounds by the application of one or more oxidizing agents that can cleave carbon bonds and other chemical bonds of the high molecular weight hydrocarbon molecules and react with the oxidizing agent to form smaller water soluble hydrocarbon molecules that may then be biologically converted to methane, carbon dioxide and other useful gases. Solubilization for the purposes of the invention means the conversion of a solid carbonaceous material, such as coal or biomass, to a form of carbon that is in solution in water, and more specifically a form of carbon comprised of compounds that are soluble in water and capable of passing through a 0.45 micron filter.

As used herein, the term "substantially" means an amount of at least generally about 80%, alternatively about 90%, or alternatively about 99%.

The present invention provides a method of converting at least a portion of a carbonaceous feedstock to soluble and biodegradable organic molecules. The invention can oxidize, depolymerize, reform and/or solubilize low-value, high molecular weight carbonaceous materials in the carbonaceous feedstock to lower molecular weight, water soluble hydrocarbons, oxo-chemicals and other organic molecules. Here, oxo-chemicals are organic molecules that comprise at least one oxygen atom.

Referring to FIG. 1, the present invention provides a method for treating a carbonaceous feedstock. The method comprises a first step of adsorbing an oxidizing agent selected from an oxygen-containing gas, hydrogen peroxide, ozone and oxidizing acids from a liquid phase of an aqueous mixture comprising water and the carbonaceous feedstock onto the surface of the carbonaceous feedstock to produce an aqueous mixture with the liquid phase having a reduced content of the oxidizing agent, and then heating this aqueous mixture to a temperature and for a sufficient time to oxidize at least a portion of the carbonaceous feedstock. The oxidizing agent adsorbed on the surface of the carbonaceous feedstock may form species of oxide (such as peroxides) on the surface of the carbonaceous feedstock. The method of the invention has the advantage of increasing oxidative depolymerization of the carbonaceous material in the feedstock and reducing the extent of oxidation of released intermediates in the liquid phase which result in undesirable products such as CO2.

In some embodiments, the carbonaceous feedstock may be too impermeable, e.g. due to limited porosity, to efficiently react with the adsorbed oxidizing agent during the heating step. In such a case, the carbonaceous feedstock may be preprocessed (e.g. comminuted) to increase its permeability or available surface area, thus increasing the susceptibility of the large carbonaceous molecules in the carbonaceous feedstock to the treatment of the present invention. Any method known in the art that is suitable for reducing the particle size of carbonaceous feedstocks may be used for the present invention. For example, physical (e.g., grinding, milling, fracture and the like) and chemical approaches (e.g., treating with surfactants, acids, bases, and oxidants, such as but not limited to acetic acid, sodium hydroxide, percarbonate, peroxide and the like) can be applied to reduce the size of the carbonaceous feedstock. In some embodiments, preprocessing may be used to break down coal, biomass, oil shale, lignite, coal derivatives and like structures to release more organic matter, or to make them more vulnerable to degradation into water soluble smaller organic molecules. Some suitable preprocessing methods are described in US 2010/0139913, WO 2010/1071533 and US 2010/0262987, the disclosures of which are hereby incorporated by reference herein.

In some embodiments, the carbonaceous material is lignocellulosic biomass as defined above. The cellulose fiber in the lignocellulosic biomass may be described as being in a two-phase state: distinct crystalline and extended amorphous regions (H. Krassig, Cellulose: Structure, Accessibility and Reactivity; Polymer Monographs 11, Gordon and Breach Science Publ.: Yverdon 1993). Depending on the degree of order of arrangement and hydrogen bonding between cellulose chains, the crystallinity of cellulose may range from 50% to 90%. The crystallinity of native cellulose is about 70% (P. H. Hermans and A. Weidinger, *J. Poly. Sci.*, IV, 135 (1949)).

Figure 3:
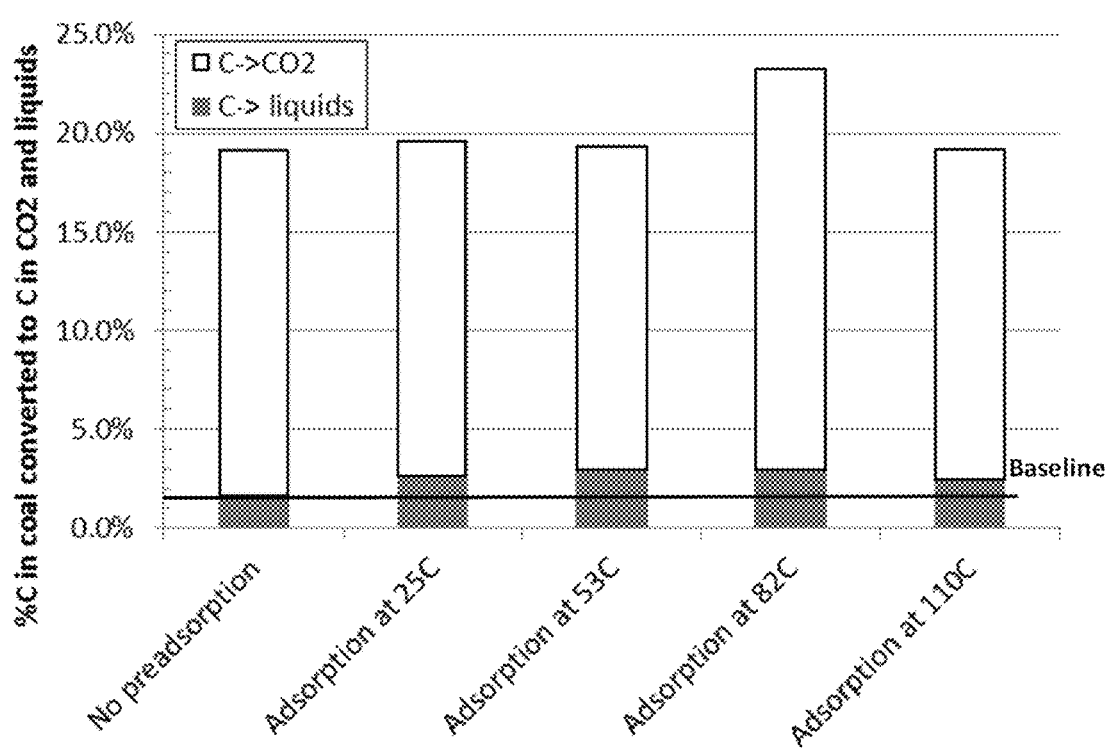
FIG. 3 shows total conversion of coal to products either remain in the liquid phase or exit as $CO_2$ as produced in Example 1.

Referring to FIG. 3, in some embodiments, the lignocellulosic biomass may be pretreated by a swelling step 10 with liquid water and/or steam for up to about 20 hours, or up to about 18 hours, or up to about 16 hours, or up to about 14 hours, or up to about 12 hours, or up to about 10 hours, or up to about 8 hours, or up to about 6 hours, or up to about 4 hours, or up to about 3 hours, or up to about 2 hours, or at least 0.5 hour, or at least 1 hour, or at least 1.5 hours, or at least 2 hours, or at least 2.5 hours, or at least 3 hours, or at least 5 hours, or at least 7 hours.

The water molecules can penetrate into the intercrystalline regions and thus swell the biomass. The swollen lignocellulosic biomass is less resistant to the penetration of the oxidizing agents of the invention. To increase the penetration of water to achieve maximum swelling, solutions of salts, acids, bases and organic water soluble compounds can be used, and preferably salts or inorganic bases. As water molecules penetrate into interior of biomass particles, they cause disruption of fibrillar associations and move into regions interlinking the crystalline ensembles forming the fibrils (Stamm, *Ind. Eng. Chem.*, Vol. 27, No. 4 (1935) 401-406).

Deeper penetration, which requires more severe conditions (temperature and pressure) and higher solute concentrations, involve the penetration of water molecules into the lattice structure of the crystallites, causing rupture of the hydrogen bonded layers and creation of accessible and reactive internal surfaces. The strong interaction of water and, for example, a strong inorganic base with the biomass, results in the opening of the intraplanar and interplanar hydrogen bonded links that cause lattice transformation, which in turn allows more water molecules to diffuse between lattice layers.

Usually, the swelling 10 of the lignocellulosic biomass by water and/or steam causes corresponding changes in the dimensions of the biomass particles. However, the changes, if any, in the dimensions of the biomass particles do not necessarily reflect the amount of water absorbed in the bulk of the particle. This is due to the presence of fine and coarse capillaries within the bulk structure of the biomass, which may allow solvents (i.e., water) to fill the available space without causing measurable changes in the dimensions of the lignocellulosic biomass.

It is believed that the action of water molecules can achieve: (1) breaking of hydrogen bonds that hold together fibril aggregates to create more reactive bulk surface areas; and (2) breaking of intraplanar and interplanar hydrogen bonds to allow different biomass components to move, dissolve or rearrange as well as allow the adsorbed oxidizing agent to penetrate to the interior of the biomass.

In some embodiments, the swelling 10 of lignocellulosic biomass is performed at a temperature higher than room temperature and with a pressure (greater than atmospheric pressure) applied. For example, the temperature of the swelling step 10 may be from about 25° C. to about 100° C., or from about 30° C. to about 90° C., or from about 35° C. to about 80° C., or from about 35° C. to about 70° C., or from about 40° C. to about 70° C., or from about 45° C. to about 70° C., or from about 45° C. to about 65° C., or from about 50° C. to about 65° C. The pressure may be less than about 30 psi, or less than about 28 psi, or less than about 26 psi, or less than about 24 psi, or less than about 22 psi, or less than about 20 psi, or less than about 18 psi, or less than about 16 psi.

in the swelling step 10, the lignocellulosic biomass may be transformed to a sponge-like structure. The swelling 10 widens the pores and capillaries and thus creates entrances to the interior of the material from the surface, as well as opening interfibrillar spaces the surface area of which now becomes available for reactions with adsorbed oxidizing agent.

It is believed that water molecules can penetrate into the amorphous regions much more readily than the crystalline regions of cellulose fibers. In addition, the amorphous and crystalline regions behave differently in most chemical reactions such as dyeing, swelling, and oxidation. It is believed that water penetration may make the crystalline regions of the cellulose fiber more accessible to the oxidizing agent.

In some embodiments, the carbonaceous feedstock is a solid such as coal which may be pulverized into smaller particles with average particle sizes of less than about 300 microns, or less than about 200 microns, or less than about 150 microns, or less than about 130 microns, or less than about 100 microns, or less than about 80 microns, or less than about 50 microns, or less than about 30 microns. In one exemplary embodiment, coal and water at about a 1:2 weight ratio are loaded into a mill with steel media. The duration of milling may be, for example, from about 15 to about 120 minutes, or from about 60 to about 90 minutes. After milling, the coal slurry may be used as an input to the adsorbing step 100 of the method of the present invention.

In some embodiments the carbonaceous feedstock is a solid such as biomass which may be pulverized into smaller particles with average particle sizes of less than about 10 millimeters, or less than about 5 millimeters, or less than about 2 millimeters, or less than about 1 millimeter in diameter.

In some embodiments, the carbonaceous feedstock is first dispersed in water to produce a slurry-like mixture. The amount of carbonaceous feedstock dispersed in the water is limited by the average size of the high molecular weight molecules in the carbonaceous feedstock that need to be oxidatively reformed. Generally speaking, higher molecular weight molecules in the carbonaceous feedstock require more intense oxidation, thus indicating use of a smaller amount of the carbonaceous feedstock in the slurry-like mixture. In producing the slurry-like mixture, the viscosity will increase in proportion to carbonaceous feedstock loading. Higher viscosities of the slurry-like mixtures may be undesirable since this may reduce mass transfer of the oxidizing agent into and out of the liquid phase and reduce mixing between the solid and liquid. Thus, a person skilled in the art would understand that the viscosity of the slurry-like mixture and the viscosity of the aqueous mixture should be maintained at levels which permit mass transfer of oxidizing agent first into the liquid phase and then to the surface of the carbonaceous feedstock. To produce the aqueous mixture, the slurry-like mixture of carbonaceous feedstock and water may be agitated in the presence of an oxidizing agent.

In some embodiments, the carbonaceous feedstock content of the aqueous mixture may be less than about 70% by weight, or less than about 60% by weight, or less than about 50% by weight, or less than about 40% by weight, based on the total weight of the mixture. The carbonaceous feedstock content of the aqueous mixture may be at or above about 30% by weight, or at or above about 25% by weight, or at or above about 20% by weight, or at or above about 15% by weight, or at or above about 10% by weight, based on the total weight of the aqueous mixture. In one embodiment, the carbonaceous feedstock is a dry solid and consists of from about 20 to about 30% by weight of the aqueous mixture.

In some embodiments the oxidizing agent is an oxygen-containing gas, which may be any gas that contains oxygen, preferably air or oxygen enriched air. In some embodiments, the oxygen-containing gas is pure oxygen. The oxidant could also be ozone or hydrogen peroxide. The oxidizing agent is preferably introduced in a manner that provides intimate contact with the slurry-like mixture. This may be accomplished, for example, by bubbling an oxygen-containing gas through the slurry-like mixture or by aerating the slurry-like mixture in a container filled with the oxygen-containing gas. Mixing of the slurry-like mixture with the oxidizing agent produces an aqueous mixture in which the oxidizing agent is dissolved and/or dispersed, especially the liquid phase of the aqueous mixture. In embodiments where the oxidizing agent is an oxygen-containing gas, the oxygen is initially transferred from a gas phase to the liquid phase of the aqueous mixture and then to the solid carbonaceous feedstock.

In one embodiment, where an oxygen containing gas is used as the oxidizing agent, a gas supply device may be used to introduce the oxygen-containing gas to the slurry-like mixture. The gas supply device may be any bubble-forming device or devices of widely varying type, shape and size that is/are suitable for transferring the oxygen of the oxygen-containing gas to the slurry-like mixture. The gas supply device may have fine bubble diffusers, draft tube aerators, mechanical aerators, brush aerators and/or coarse bubble diffusers, along with the necessary accessory equipment to support the operation of the device. The fine bubble diffuser may be one of those in the form of tubes, disks, domes and sheets, whether of elastomeric, ceramic or fibrous material. Examples of coarse bubble diffusers include hood, nozzle, orifice, valve and shear devices.

In some embodiments, the gas that exits the aqueous mixture is recycled back to the mixture for at least one other pass, with or without being enriched with oxygen. The exit gas may still contain a significant amount of oxygen that may be dissolved in the mixture if the gas is recycled for another pass through the mixture. The purpose of this step is to have a large amount of oxygen dissolved in the liquid phase thus providing sufficient oxygen for ultimately oxidizing and depolymerizing the carbonaceous materials in the carbonaceous feedstock.

In some embodiments, water is mixed with the oxidizing agent to form a solution, which is then mixed with the carbonaceous feedstock to form the aqueous mixture. The water may be agitated in the presence of an oxidizing agent. The oxidizing agent is provided in intimate contact with water. This may be accomplished for example by bubbling an oxygen-containing gas through the water or by aerating water in a container filled with the oxygen-containing gas. In embodiments the oxidizing agent is an oxygen containing gas, the oxygen mass is transferred from a gas phase into the water. The oxygen containing gas may be introduced by a gas supply device including any bubble-forming device or devices of widely varying type, shape and size. In some embodiments, the gas that exits the water is recycled back to the water for another pass, with or without being enriched with oxygen. The exit gas may still contain significant amount of oxygen that may be dissolved in the water if the gas is recycled for at least one other pass through the water. The purpose of this step is to ensure that a large amount of oxygen is dissolved in the water thus providing sufficient oxygen for ultimately oxidizing and depolymerizing the carbonaceous material in the carbonaceous feedstock. The aqueous solution of the oxidizing agent is then mixed with the carbonaceous feedstock to form the aqueous mixture.

The aqueous mixture contains water, an oxidizing agent and a carbonaceous feedstock. The oxidizing agent is dissolved in the liquid phase of the aqueous mixture and is thus ready to be used to oxidize and depolymerize the carbonaceous material. Water obtained from the environment generally has oxygen dissolved in the water. However, oxygen-containing gas may still be introduced into the water or the slurry-like mixture to increase the oxygen content in the water or the slurry-like mixture in order to make more oxygen available for oxidizing and depolymerizing the carbonaceous feedstock in the heating step 200.

Referring to FIG. 1, the step of adsorbing 100 the oxidizing agent is employed to transfer a proportion of the oxidizing agent from the liquid phase of the aqueous mixture onto the carbonaceous feedstock by adsorption to produce an aqueous mixture with the liquid phase having a reduced content of the oxidizing agent, while at the same time providing oxidizing agent adsorbed on the surface of the carbonaceous feedstock.

Adsorbing step 100 is carried out at a temperature below the temperature required for significant reaction (oxidative depolymerization, solubilization, etc.) of the carbonaceous feedstock with the dissolved oxidizing agent. Depending on the oxidizing agent and/or nature of the carbonaceous feedstock used, the temperature of the adsorbing step 100 may vary. For example, biomass may react with oxidizing agent at a lower temperature than a mature coal. A person skilled in the art may conduct routine experimentation to determine a suitable temperature for the adsorbing step 100 for any particular carbonaceous feedstock. Suitable temperatures would be temperatures which do not result in a significant amount of oxidative depolymerization products of the biomass or coal and thus this determination can be made by analysis of the mixture for oxidation products.

It is to be understood that the oxidizing agent adsorbed on the surface to the solid carbonaceous feedstock may react with the carbonaceous material therein to form several species of oxidation products, such as peroxide, epoxide, or hydroperoxide structures on the surface of the carbonaceous feedstock in a bond forming mechanism. But the formation of these oxidation products does not directly lead to depolymerization of the carbonaceous material in the feedstock under the condition of the adsorbing step 100. When the temperature of the aqueous mixture is raised, the oxidation products will cause depolymerization of the carbonaceous material, thus produce water soluble smaller organic molecules.

The type and amount of solubilized oxidizing agent in the aqueous mixture may also impact the temperature range that is suitable for the adsorbing step 100. In some embodiments, the incubation temperature for adsorption may below about 220° C., or below about 210° C., or below about 200° C., or below about 190° C., or below about 180° C., or below about 170° C., or below about 160° C., or below about 150° C., or below about 140° C., or below about 130° C., or below about 120° C. In one embodiment, the temperature for the adsorbing step 100 is preferably below about 175° C., and most preferably below about 150° C.

During the adsorbing step 100, dissolved oxidizing agent in the liquid phase is adsorbed onto the solid carbonaceous feedstock particles in the aqueous mixture through physical and/or chemical adsorption. The oxidizing agent is thereby transferred from the liquid phase to the surface of the solid carbonaceous feedstock in the aqueous mixture. As a result, the amount of oxidizing agent in the liquid phase of the aqueous mixture is depleted to a reduced content of the oxidizing agent. Ultimately, in the case of gaseous oxidizing agents, the amount of gaseous oxidizing agent solubilized in the liquid phase and the rate of mass transfer is directly dependent on the partial pressure of the gaseous oxidizing agent and the amounts that can be adsorbed onto the solid carbonaceous feedstock.

Thus, in the present invention one suitable method for determining absorption of oxidizing agent in a batch process involves two steps. First, establishing a set of conditions for contacting the liquid solution of oxidizing agent with the carbonaceous material which do not permit substantial chemical reaction between the oxidizing agent and the carbonaceous material. Second, measuring the content of the oxidizing agent in the liquid solution before and after adsorption to determine that the concentration of oxidizing agent in the liquid solution has been reduced. Since the adsorption step is conducted under conditions where little or no chemical reaction can occur, the reduced concentration of the oxidizing agent in the liquid solution will be proportional to the amount of adsorption because adsorption will be the primary process that is taking place under those conditions.

In one embodiment where the oxidizing agent is gaseous, it may involve continuous supplying of a gas comprising the gaseous oxidizing agent to the liquid solution. As such, comparison if the gas entering the liquid solution and gas exiting the liquid solution in terms of their content of the gaseous oxidizing agent on a continuous basis may indicate the total amount of oxidizing agent being transferred to the liquid solution from the gas. Subtracting the amount of the oxidizing agent left in the liquid solution, one may be able to determine the adsorption of the gaseous oxidizing agent on the solid carbonaceous feedstock.

In a preferred embodiment where the oxidizing agent is air or oxygen-enriched air, both of the major constituents of the air, namely, nitrogen and oxygen, may be adsorbed on the carbonaceous feedstock particles. Under such circumstances, nitrogen will be preferentially displaced by oxygen near the surface of the carbonaceous feedstock particles due to the relative chemical potentials of the oxygen and nitrogen. This mass transfer is believed to result in a longer term effect of adding several stacked layers of oxygen onto the surface of the carbonaceous feedstock particles, potentially with one or more layers of nitrogen atop the layers of oxygen.

Air is particularly preferred as the oxidant in the present invention since air is not as strong an oxidizing agent as some others such as oxygen and hydrogen peroxide. This can help prevent further oxidation of the water soluble organic molecules released into the liquid phase as a result of the initial oxidization and depolymerization of the carbonaceous feedstock. In addition, there may be some oxygen dissociation on the surface of carbonaceous feedstock particles with the formation of peroxides or hydroperoxides, the extent of which depends on temperature. The formation of peroxide and hydroperoxide may prepare the carbonaceous feedstock for reaction with the oxygen as the temperature of the aqueous mixture is raised in the heating step 200.

Since the temperature for the adsorbing step 100 is maintained at a temperature below temperatures required for oxidization and depolymerization of the carbonaceous feedstock, little or no water soluble organic molecules are released from the carbonaceous feedstock into the liquid phase during the adsorbing step 100. The pressure during the adsorbing step 100 may also be important, especially the oxygen partial pressure when oxygen-enriched gas is used as the oxidizing agent. In some embodiments, the pressure is at or above the corresponding steam pressure.

The duration of the adsorbing step 100 is preferably a time sufficient to produce maximum pore filling and adsorption of the oxidizing agent on the surface of the carbonaceous feedstock. Depending on the nature and characteristics of the carbonaceous feedstock, a skilled person can adjust the duration of the adsorbing step by developing traditional adsorption isotherm using methods known to those skilled in the art.

The porosity of the carbonaceous material may also affect the duration of the adsorbing step. For example, if the carbonaceous feedstock is highly porous and has a deep internal porosity, the adsorbing step 100 should be conducted for a longer period of time (or higher pressure) to allow for complete pore filling and for adsorption to occur in the deeper pores once filled. On the other hand, if the carbonaceous feedstock is less porous and has little internal porosity, the adsorbing step 100 may be conducted for a shorter period of time or at lower pressure.

The particle size of the carbonaceous feedstock may also affect the duration of the adsorption step. When the carbonaceous feedstock particles are of a relatively smaller size, it is easier to maximize surface coverage and matrix penetration by the oxidizing agent, thus requiring a shorter duration for the adsorbing step.

In some embodiments, the adsorbing step 100 may be conducted for a period less than about 1 hour, or less than about 50 minutes, or less than about 40 minutes, or less than about 30 minutes, or less than about 20 minutes, or less than about 10 minutes, or less than about 8 minutes, or less than about 5 minutes. In some embodiments, the adsorbing step may be conducted for at least 1 minute or at least 2 minutes or at least 5 minutes or at least 10 minutes or at least 20 minutes or at least 30 minutes or at least one hour. In some other embodiments, the adsorbing step 100 may be conducted for a period up to about 2 hours, or up to about 3 hours.

During the adsorbing step 100, oxidizing agent dissolved in the liquid phase of the aqueous mixture is adsorbed onto the surface of the carbonaceous material. Without being bound by any theory, adsorption of the oxidizing agent on the carbonaceous feedstock particles may occur through both physical and chemical interactions. The physical interaction or physisorption, between the oxidizing agent and the carbonaceous material may involve weak bonds, such as van der Waals interaction, dipole-dipole interaction, hydrophobic interaction, ionic interaction or electrostatic interaction, or combinations thereof. The oxidizing agent may also enter pores in the carbonaceous material and penetrates into internal pores of the carbonaceous material.

Adsorption may also involve chemical interaction, or chemisorption, such as chemical bonding between the oxidizing agent and the carbonaceous feedstock particles. There are differences in the activation energy between physical and chemical adsorption. Chemisorption requires a relatively higher activation energy than physisorption, and is adiabatically irreversible, thus making desorption of the chemisorbed oxidizing agent a slow process. Physisorption, in contrast, has a very low, if not immeasurable activation energy, and is thus highly reversible and thus desorption of physisorbed oxidizing agent may be a fast process.

The adsorbing step 100 may be performed in any type of vessel or tank. The vessel may have a mechanical agitation device to facilitate contact between the dissolved oxidizing agent and carbonaceous material. In such embodiments, the adsorbing step 100 may include continuous or periodic agitation of the aqueous mixture. In some embodiments, bubbles of the oxygen-containing gas may be continuously flowed through the aqueous mixture during the adsorbing step 100, which can both supply more oxidizing agent to the aqueous mixture and agitate the aqueous mixture.

The effect of the adsorbing step 100 is to transfer the mass of the oxidizing agent from the liquid phase in the aqueous mixture to the surface of the solid carbonaceous feedstock particles. This mass transfer step is conducted in mild conditions to avoid or substantially prevent oxidative depolymerization of the carbonaceous materials during the adsorbing step. Although the invention speaks to the adsorbing step 100 being done in aqueous mixture, it is conceivable that adsorption might be accomplished to some degree as a gas-solid system, eliminating the liquid phase as an intermediate for the mass transfer from the gas to the solid feedstock. In this case, one has to use great cautions as not to permit temperatures to climb from the adsorption that would accelerate reactions between the oxidizing agent and the feedstock, and even more heat release resulting in spontaneous combustion. The inventors prefer water for its added benefit as a thermal quench and the safe adsorption and eventual controlled oxidative depolymerization reactions without the possibility of thermal runaway.

The amount of oxidizing agent, including both the amount initially added to the aqueous mixture and optionally the amount continuous introduced into the aqueous mixture during the adsorbing step 100. By the end of the adsorbing step 100, a significant portion of the oxidizing agent in the aqueous mixture (including optionally the oxidizing agent continuously introduced during the adsorbing step 100) has been transferred from the liquid phase to being adsorbed on the surface of the carbonaceous. In some embodiments, at least about 30% of the dissolved oxidizing agent mass is transferred to the surface of the carbonaceous material at least about 40% or at least about 50% or at least about 60% or at least about 70% or at least about 80% or at least about 85% or at least about 90% or at least about 95% of the oxidizing agent mass is transferred to being adsorbed on the surface of the carbonaceous material. In some embodiments, a person skilled in the art may use measured isotherms to determine the amount of oxidizing agent adsorbed on the solid carbonaceous feedstock.

Referring to FIG. 1, after the adsorbing step 100, the temperature of the aqueous mixture is raised in heating step 200 to a desired temperature to induce oxidation and depolymerization of the carbonaceous material. During the heating step 200, the liquid phase remains and still has a reduced content of the oxidizing agent relative to the initial concentration of the oxidizing agent in the liquid phase prior to the adsorbing step. When the temperature is raised during the heating step, the oxidizing agent adsorbed on the surface of the carbonaceous will begin to oxidize and depolymerize the carbonaceous material to produce water soluble organic molecules. Since a large proportion of the oxidizing agent is in intimate contact with the carbonaceous material upon initiation of the oxidation reaction, the reaction will favor oxidation of the carbonaceous material over oxidation of downstream products of the oxidation reaction.

In some embodiments, the invention aims at achieving an average and final oxygen to carbon molar ratio (O/C) in the distribution of products formed in the heating step 200. Knowing the initial O/C ratio of the incoming carbonaceous feedstock, one skilled in the art can compute the amount of oxygen that ultimately needs to be added through the insertion and reaction phase of the process. After generating an adsorption isotherm of a particular carbonaceous feedstock, one can ultimately determine the filling capacity of oxygen that can be adsorbed onto the surface the solid feedstock. The adsorbed oxygen is provided to oxidatively depolymerize the carbonaceous material in the feedstock in the heating step 200. It is conceivable that the oxygen depleted air exiting the adsorbing step 100, in combination with some amount or no amount of makeup air, may be recycled and reused to continuously supply oxygen to the aqueous mixture. It is possible and possibly more efficient to carry out the adsorbing step 100 at a higher pressure than the heating step 200.

The temperature of the heating step 200 is higher than the temperature of the adsorbing step 100 to enhance the oxidation chemical potential of the oxidizing agent during the heating step 200 to initiate oxidation and depolymerization of the carbonaceous material. The temperature of the heating step 200 may be dependent on the characteristics of the carbonaceous feedstock. For example, biomass and coal with higher oxygen content may be oxidized and depolymerized at a lower temperature than coal that has a lower oxygen content. The oxygen-containing moieties in coal are believed to be primarily associated with aliphatic sections of the coal having relatively weak bonds. Hence, when the high oxygen content coal is exposed to the oxidizing agent in the aqueous mixture, these weak bonds may be broken in the coal. In contrast, more mature or older coal typically has higher aromaticity and thus stronger chemical bonds that may require higher temperatures in the heating step 200 to provide sufficient oxidation and depolymerization. For biomass, oxygen is associated primarily with lignin, cellulose, and hemicellulose and is configured with higher oxygen content and requires less temperature.

In some embodiments, the temperature of the heating step 200 from about 120-250° C., or 140-240° C., or 150-230° C., or 160-220° C., or 160-210° C., or 160-200° C., 160-190° C., or less than about 220° C., or less than about 210° C., or less than about 200° C., or less than about 190° C., or less than about 180° C., or less than about 170° C., or less than about 160° C.

As a result of raising the temperature of the aqueous mixture during the heating step 200, the pressure in the vessel in which the aqueous mixture is being heated will also rise. High pressure in the reaction vessel is preferred as it has the additional benefit of ensuring that most, if not all, of the physically and chemically adsorbed oxidizing agent to be retained on the surface of the carbonaceous material. The pressure during the heating step 200 may be from about 10-1230 psig, or from about 50-1000 psig, or from about 100-800 psig, or from about 150-600 psig, or from about 200-500 psig, or below about 400 psig, or below about 300 psig, or below about 200 psig, or below about 150 psig, or below about 100 psig, or below about 50 psig.

The duration of the heating step 200 may be less than about 4 hours, or less than about 3.5 hours, or less than about 3 hours, or less than about 2.5 hours, or less than about 2 hours, or less than about 1.75 hours, or less than about 1.5 hours, or less than about 1.25 hours, or less than about 1 hour, or less than about 0.75 hour, or less than about 0.5 hour, or less than about 0.25 hour. The duration of the heating step 200 may be more than about 10 minutes, or more than about 20 minutes, or more than about 30 minutes, or more than about 40 minutes, or more than about 50 minutes, or more than about 1 hour.

In some embodiments, the conditions of the heating step 200 including temperature, pressure and duration may also depend on molecular and elemental characteristics of the particular carbonaceous feedstock. Examples of the characteristics of the carbonaceous feedstock which may be taken into consideration are the degree of aromaticity, the hydrogen to carbon ratio, the oxygen to carbon ratio, the nitrogen to carbon ratio, the sulfur to carbon ratio, the mineral or ash content, and other factors such as particle size. Thus, in some embodiments, a blend of carbonaceous feedstocks of different characteristics may enhance the efficiency of the downstream steps in the method by adjusting one or more of these characteristics. For example, blending a highly aromatic, more difficult to react, carbonaceous feedstock, such as coal, with a more acyclic carbonaceous feedstock, such as agricultural waste or synthetic polymer waste, may result in an oxidized product stream that is more biodegradable and will support greater microbial population densities, as well as increase the rate and depth of conversion of the less reactive molecules.

In some embodiments, the heating step 200 may comprise at least two sub-steps: one substep with a set of conditions (temperature and/or pressure) for a first duration to generate one class/type of water soluble organic molecules, and a second sub-step with a different set of conditions (temperature and/or pressure) for a second duration to generate another class/type of water soluble organic molecules. Such embodiments have the advantage of directing the process to produce desired water soluble organic molecules. For example, the carbonaceous feedstock may be subject to a first sub-step of heating to a temperature suitable for the production of alcohols. The treated carbonaceous feedstock may then be subjected to a second substep of heating to produce acids that can be used as feedstock for microorganisms.

In some embodiments, there are two significant purposes for the heating step 200: enhancing biodegradability in the microbial digester and converting the carbonaceous feedstock to desired organic molecules. Thus, it may be desirable to conduct the heating step 200 as multiple sequential steps in order to better achieve both of these purposes. For example, if a first heating step 200 has its conditions optimized to provide products with enhanced biodegradability, a second heating step 200 could be selected to achieve oxidative cracking solubilization of the remaining carbonaceous feedstock. In such processes the reaction product of a previous heating step may be used as the feed to the following heating step or, alternatively, only selected components of the products of a previous heating step, such as only solid materials, may be fed to a subsequent heating step.

The conditions of each heating step 200 may be adjusted to favor different reactions, rates of reaction, degrees of conversion, etc. For example, one heating step 200 may have reaction conditions optimized for the production of valuable oxo-chemicals and another heating step 200 may have its reaction conditions optimized for enhancing biodegradability of the reaction products.

In embodiments where the carbonaceous feedstock is biomass, which is composed primarily of three main polymers, cellulose, hemicellulose and lignin, the reaction conditions may be chosen to selectively depolymerize each polymer based on its individual characteristics. For example, hemicellulose decomposes at much lower temperatures than cellulose or lignin. Thus in order to avoid overreacting a feedstock that predominantly consists of cellulose, the reaction may be carried out at a lower temperature, followed by further reacting the residual solids at a higher temperature to further depolymerize the remaining cellulose and lignin components.

Without wishing to be bound by any theory, the heating step 200 may comprise acid formation which can accelerate hydrolysis of hemicellulose and cellulose (autohydrolysis). It appears that the dissociation of oxygen may start the process of hydrolyzing the celluloses, once the lignin surrounding the fiber bundles is degraded. Low molecular weight organic acids ($C_1$-$C_4$) are preferentially formed from lignin and then hemicellulose. The increase in free protons from the generation of the organic acids, whose concentration is increasing with the extent of conversion, further accelerates the hydrolysis of the celluloses in the biomass. The breakdown of hemicellulose in itself may release some sugar acids that also help to increase the free protons that are available in the reaction mixture in the form of organic acids.

Furthermore, given the fact that the adsorbing step can transfer weak oxidizing agent to the solid feedstock and the heating step 200 uses a lower reaction temperature than used in the prior art, the sugars produced by depolymerizing biomass are not substantially oxidized, as is the case in the prior art. In addition, the lignin components in the biomass are broken down to a stream of acids and carbon dioxide that is neither inhibitory to the use of enzymes to enhance hydrolysis of the polysaccharides and residual cellulose and hemicellulose solids, nor to the microorganisms that process the sugars to a final product, such as ethanol, succinic acids and the like. This is significant because no separation of the variety of products of the various reactions is required prior to fermentation by microorganisms.

In some embodiments, the organic acids produced by the present invention may be recycled back to the adsorbing step 100 or heating step 200, or additional organic acids may be added to the adsorbing step 100 or heating step 200. The organic acids, such as acetic and formic acids, and $C_3$-$C_4$ acids, are preferably added to reduce the average pH in the aqueous mixture to an acidic pH that is as low as possible during the heating step 200, which leads to a more efficient autohydrolysis reaction during the heating step 200.

Using these organic acids can also provide the benefit of not having to add the anions of typical mineral acids, such as phosphates, sulfates, and nitrates to the reaction mixture in the process of lowering the pH. These anions are undesirable because they have been proven inhibitory to microorganisms during downstream fermentation of the product from the heating step 200 or the formation of biogas. These anions also have an effect on downstream separation of the organic acids of interest. Further, if these mineral acids are added at the time of milling the biomass or immediately thereafter, they may cause some decomposition of the biomass prior to adsorption. This is not desirable as decomposition (depolymerization) before the heating step 200 is to be avoided in order to minimize loss of carbon due to formation of carbon dioxide.

The oxidizing agent, by oxidatively depolymerizing the carbonaceous materials, actually inserts oxygen into the polymers in the carbonaceous material, which will increase the O/C molar ratio in the depolymerization products, in comparison with the carbonaceous material of the feedstock. In some embodiments, the products of the heating step 200 have a O/C molar ratio that is from 30% to 200%, or from 40% to 180%, or from 50% to 160%, or from 60% to 140%, or from 70% to 120%, or from 80% to 100% higher than the O/C molar ratio of the carbonaceous material of the feedstock.

The O/C ratio of the carbonaceous feedstock and the product of depolymerization after the heating step 200 may be measured by an industry standard method, such as "Ultimate Analysis of Coal and Coke" (ASTM-D3176).

The reaction product of a previous heating step 200 may be altered in some way before feeding it to the following heating step 200 by, for example, chemically or physically separating one or more components of the reaction product. Also, the reaction product or one or more components thereof may be recycled to the initial adsorbing step 100. At least one additional pass through the adsorbing step 100 and heating step 200 can be used to enhance or complete conversion and solubilization of the carbonaceous feedstock. For example, carbonaceous feedstock solids from the heating step 200 may be separated by mechanical means to be recycled. Filtering, settling, centrifuging, hydrocycloning and other techniques may be used for this purpose.

Because a large portion of the dissolved oxidizing agent has been transferred to the surface of the carbonaceous feedstock particles during the adsorbing step 100, there is a reduced amount, or little oxidizing agent dissolved in the liquid phase, even when the oxidizing agent is continuously supplied to the liquid phase during the adsorbing step 100.

Thus, the carbonaceous materials in the carbonaceous feedstock are preferentially oxidized by the adsorbed oxidizing agent and the produced water soluble organic molecules that migrate to the liquid phase are less likely to be further oxidized to carbon dioxide as would be the case in many prior art processes. As such, the process of the present invention can provide products having a larger proportion of water soluble organic molecules and a lower proportion of carbon dioxide than many prior art process. As a result, the carbon loss due to complete oxidation of carbonaceous materials to carbon dioxide is reduced as compared to many prior art methods.

The heating step 200 may optionally be carried out in the presence of a catalyst. In come embodiments, at least one catalyst may be added to the aqueous mixture after the adsorbing step 100, preferably before or at the beginning of the heating step 200. The catalyst may catalyze the oxidation reaction by, for example, causing or enhancing formation of peroxides and superoxides on the surface of the carbonaceous feedstock particles. The peroxides and superoxides may enhance the rate of oxygen insertion into the carbonaceous materials.

Generally speaking, the catalyst is selected from zeolites, silicas, aluminas, silica aluminas, clays, activated carbon, diatomaceous earth, titania, zirconia, molybdena and ceramics impregnated with transition, precious, alkali, alkali earth metals, mixed with metal oxides, and the like. In some embodiments, the catalyst may be selected from water insoluble metals, transition metals, and precious metals. Examples of these metals include nickel, cobalt, platinum, palladium, rhenium, copper, vanadium and ruthenium.

In some embodiments, the catalyst is prepared by impregnating a support material with an aqueous or organic solution containing a metallic element (transition metals, alkali metals, alkaline earth metals and a mixture thereof). The metallic element suitable for use in preparing the catalyst may be Group IA elements such as Li, Na and K, Group VIII elements such as Ru, Co, Fe, Pt, Pd, Ni, Co and Rh, Group VII elements such as Mn, Group IB elements such as Cu and a mixture thereof; preferably, Ru, Co, Fe, Cu, Mn and a mixture thereof. The metallic element may be in a solution form with water as the solvent or an organic solvent in a concentration ranging from about 0.0001 to about 100% by weight; more preferably about 0.01 to about 50% by weight; and most preferably about 0.1 to about 10% by weight, based on the amount of the support material used.

In some embodiments, the support material contains at least one kind, or a composite oxide containing at least two kinds of oxide selected from the group consisting of iron, titanium, silicon, aluminum and zirconium. In particular, the support material contains a titanium oxide, or a mixture or a composite oxide between titanium oxide and an oxide of at least one kind of a metal selected from the group consisting of zirconium, iron, silicon and aluminum, preferably, a titanium oxide, or a mixture or a composite oxide between titanium oxide and an oxide of at least one kind of a metal selected from the group consisting of zirconium and iron. In particular, the support material preferably contains at least titanium or zirconium; and as the more preferable carrier, titania or one containing a mixed oxide or a composite oxide containing titania, (for example, $TiO_2$—$ZrO_2$, $TiO_2$—$Fe_2O_3$, $TiO_2$—$SiO_2$, $TiO_2$—$Al_2O_3$ or the like), is also desirable, in view of mechanical strength and durability of the catalyst.

Content ratio of the catalyst and the support material is not especially limited. However, in the embodiment where the catalyst is a noble metal (for example, platinum, palladium, rhodium, ruthenium, iridium, gold and silver), it is desirable that the catalyst has an amount of equal to or more than about 0.01% by mass, more preferably equal to or more than about 0.05% by mass, further preferably equal to or more than about 0.1% by mass; preferably equal to or less than about 3% by mass, more preferably equal to or less than about 2% by mass, further preferably equal to or less than about 1% by mass, relative to the support material. When the catalyst is not a noble metal (such as transition metals: manganese, cobalt, nickel, cerium, tungsten, and copper), it is preferable that the catalyst has an amount of equal to or more than about 0.1% by mass, more preferably equal to or more than about 0.5% by mass, further preferably equal to or more than about 1% by mass; preferably equal to or less than about 30% by mass, more preferably equal to or less than about 20% by mass, further preferably equal to or less than about 10% by mass, relative to the support material.

A pore volume of the support material is preferably equal to or larger than about 0.20 ml/g, and more preferably equal to or larger than about 0.25 ml/g; preferably equal to or smaller than about 0.50 ml/g, and more preferably equal to or smaller than about 0.45 ml/g. The pore volume can be measured by a commercially available apparatus using a mercury injection method.

The catalyst/support material may be in the form of particles, pellets, or honeycombs. When the catalyst/support material is in particle form, the average particle diameter is preferably equal to or larger than about 1 mm, more preferably equal to or larger than about 2 mm. Also, the average particle diameter of the particulate catalyst is preferably equal to or smaller than about 10 mm, and more preferably equal to or smaller than about 7 mm.

In some embodiments, the catalyst/support material is a pellet form, with an average diameter equal to or larger than about 1 mm, preferably equal to or larger than about 2 mm; preferably equal to or smaller than about 10 mm, and more preferably equal to or smaller than about 6 mm. Also, length of the pellet-like catalyst/support material in a longitudinal direction is preferably equal to or longer than about 2 mm, and more preferably equal to or longer than about 3 mm; preferably equal to or shorter than about 15 mm, and more preferably equal to or shorter than about 10 mm.

In some embodiments, the catalyst/support material is in the form of honeycomb, with an equivalent diameter of a through-hole is preferably equal to or larger than about 1.5 mm, more preferably equal to or larger than about 2.5 mm, preferably equal to or smaller than about 10 mm, and more preferably equal to or smaller than about 6 mm. In addition, thickness between the adjacent through-holes in the honeycomb is preferably equal to or larger than about 0.1 mm, more preferably equal to or larger than about 0.5 mm, preferably equal to or smaller than about 3 mm, and more preferably equal to or smaller than about 2.5 mm. Furthermore, hole opening ratio at the catalyst surface is preferably equal to or more than about 50%, more preferably equal to or more than about 55%, preferably equal to or less than about 90%, and more preferably equal to or less than about 85%, relative to total surface area.

In some embodiments, a solubilizing agent may be added to the aqueous mixture, preferably before or at the beginning of the heating step 200. The solubilizing agent may be selected from mineral acids or mineral bases. Preferred bases include Group I (alkali metals) and Group II (alkaline earth) oxides, hydroxides, carbonates, borates, or halogenates. In particular, sodium, potassium, calcium, and magnesium compounds are preferred. Examples of the solubilizing agents include sodium hydroxide, potassium hydroxide, sodium carbonate and potassium carbonate. Naturally occurring minerals of some of these materials are also appropriate for use in this process. These include, but are not limited to Nahcolite, Trona, Thermonatrite, Gaylussite, Hydromagnesite, Lansfordite, Ikaite, Hydrocalcite, Dolomite, Huntite, Aragonite, Natrite, Magnesite, Calcite, Kalcinite, Gregoryite, and others.

The mineral bases generally comprise no more than about 15 wt % of the aqueous mixture provided to the heating step 200, and preferably comprise below about 10 wt % and most preferably at or below about 6 wt % of the aqueous mixture provided to the heating step 200. In some embodiments, the solubilizing agent comprises at least about 1 wt % or at least about 3 wt % or at least about 5 wt % of the aqueous mixture fed to the heating step 200.

The vessel for the heating step 200 may be the same as or different from the vessel used for the adsorbing step 100. If different vessels are used for the two steps, the aqueous mixture is transferred to the vessel for the heating step 200 after the adsorbing step 100 in the previous vessel. The vessel for the heating step may be any type of reactor/tank/vessel known in the art that is suitable for the temperature and pressure required for the present invention. Examples of suitable vessels include plug flow reactors, bubble columns, and stirred tanks. The heating step 200 may be carried out in continuous, semi-continuous, or batch mode.

In some embodiments, the vessel for the heating step 200 may be a dual stage reactor for a multi-component carbonaceous feedstock such as biomass where the initial stage may be used, for example, to oxidatively depolymerize hemicellulose at a low temperature and a second stage may be used to convert the cellulosic fraction at a slightly higher temperature. This reaction may be auto-catalyzed by acids released from the hemicellulose. The second stage of this reaction resembles an acid hydrolysis process where no oxidizing agent is required.

The method of the present invention can be conducted in batch, semi-batch, or continuously. At least portion of the carbonaceous material may be oxidized to organic acids, such as oxalic acid, mellitic acid, benzoic acid, formic, succinic, and acetic acid. In addition, high molecular weight organic molecules in the feedstock may be depolymerized/reformed to lower molecular weight water soluble organic molecules. In some embodiments, mineral bases are used to increase the pH of the aqueous mixture to an alkaline pH of greater than about 7, greater than about 9 or greater than about 10. In such mixtures, the formed organic acids will be present in salt form due to the presence of the mineral base. Such salts may be recovered from the reaction products by filtering off the solid material and extracting the oxalic acid therefrom with dilute hydrochloric or sulfuric acid. The salts of mellitic acid and like acids can be isolated from the filtrate by acidifying, warming, and filtering the warm liquid, while acetic acid can be recovered from the residual liquid by, for example, steam distillation.

In some embodiments, the oxidation reactions occur via a free radical mechanism. The initiation of the reactions occurs when an oxygen radical reacts with water to form hydrogen peroxide and thus creates a hydroxyl radical, which, in turn, reacts with the organic molecules to form organic peroxides and radicals. Reaction propagation occurs via the hydroxyl radical intermediate, as shown in the schemes below:

O=O→O.+O.

 (Initiation)

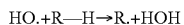 (Propagation)

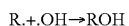 (Termination)

Multiple reactions may occur during the heating step 200, including oxidization, depolymerization, reforming and solubilization. These reactions convert the carbonaceous feedstock to lower molecular weight water soluble organic molecules such as hydrocarbons and oxygenated organic compounds, and for biomass, C5 and C5 sugars and solubilized and oxidized lignin components, as well as other low molecular weight compounds. The water soluble organic molecules produced in the heating step 200 may be used as a feedstock for microorganisms to produce useful final products or may be purified for industrial and commercial applications.

Examples of oxygenated hydrocarbons include alcohols, aldehydes, carboxylic acids, salts of carboxylic acids, esters, ethers, anhydrides, and like. Oxygenated compounds may be monofunctional, difunctional, trifunctional, or polyfunctional. Included in the definition of oxygenated hydrocarbons are also compounds with more than one functional group, such as polyols, dicarboxylic acids, triacids, polyesters, polyethers, aldehydic acids, and like. Included in the definition of oxygenated hydrocarbons are also compounds in which there is more than one functional group wherein the functional groups are different. They may bemonomers, dimers, trimers, etc. They can be $C_5$ and $C_6$ sugar monomers, polysaccharides of numerous base units, etc.

Examples of carboxylic acids include compounds of the formula R—COOH, wherein R is an alkyl group. Particular examples include formic acid, methanoic acid, acetic acid, ethanoic acid, propionic acid, butyric acid, butanoic acid, valeric acid, pentanoic acid, caproic acid, hexanoic acid, enanthic acid, heptanoic acid, caprylic acid, octanoic acid, pelargonic acid, nonanoic acid, capric acid, decanoic acid, undecylic acid, undecanoic acid, lauric acid, dodecanoic acid, tridecylic acid, tridecanoic acid, myristic acid, tetradecanoic acid, pentadecanoic acid, palmitic acid, hexadecanoic acid, margaric acid, heptadecanoic acid, stearic acid, octadecanoic acid, arachidic acid, and icosanoic acid.

Dicarboxylic acids of the present invention are organic compounds that contain two carboxylic acid groups. Such dicarboxylic acids may comprise additional heteroatoms, such as oxygen, nitrogen, or sulfur. Dicarboxylic acids may be aliphatic or aromatic. Aside from the two —COOH groups, dicarboxylic acids may be saturated or unsaturated. The dicarboxylic acids may be represented by the formula HOOC—R—COOH, wherein R is a difunctional organic group, such as alkylene, alkenylene, alkynylene, arylene, and any of the preceding modified by a one or more heteroatoms.

Examples of dicarboxylic acids include compounds such as alkylene dicarboxylic acids, having the general formula HOOC—$(CH_2)_n$—COOH wherein n is 0 to 12; monounsaturated forms thereof; di-unsaturated forms thereof; tri-unsaturated forms thereof, and polyunsaturated forms thereof. More specific examples of dicarboxylic acids include oxalic acid, ethanedioic acid, malonic acid, propanedioic acid, succinic acid, butanedioic acid, glutaric acid, pentanedioic acid, adipic acid, hexanedioic acid, pimelic acid, heptanedioic acid, suberic acid, octanedioic acid, azelaic acid, nonanedioic acid, sebacic acid, decanedioic acid, undecanedioic acid, and dodecanedioic acid.

Examples of aromatic dicarboxylic acids include phthalic acid, benzene-1,2-dicarboxylic acid, o-phthalic acid, isophthalic acid, benzene-1,3-dicarboxylic acid, m-phthalic acid, terephthalic acid, benzene-1,4-dicarboxylic acid, and p-phthalic acid.

Examples of monounsaturated acids include maleic acid, (Z)-butenedioic acid, fumaric acid, (E)-butenedioic acid, glutaconic acid, pent-2-enedioic acid, traumatic acid, and dodec-2-enedioic acid. Example of di-unsaturated acids includes three isomeric forms of muconic acid, and (2E,4E)-hexa-2,4-dienedioic acid.

The alcohols, ethers, aldehydes, esters, and carboxylic acids may be monofunctional, or polyfunctional. For example, the treatment of the carbonaceous feedstock by the method of the present invention may result in mono-, di-, and tricarboxylic fatty acids. Besides the water soluble organic molecules, the present invention may also produce minerals, and inorganic chemicals depending, in part, on the composition of the carbonaceous feedstock.

Sugars may also be produced from the carbonaceous feedstock by the present invention. The sugars produced by the process may vary depending on the particular feedstock used. For example, hemicelluloses are generally composed of xylan, glucuronoxylan, arabinoxylan, glucomannan, or xyloglucan polysaccharides. These polysaccharides contain many different sugar monomers such as glucose, xylose, mannose, galactose, rhamnose, and arabinose. Regarding cellulose, the sugars include glucose monomers and glucose oligomers.

The products of the present invention may be used as raw materials for various industries such as the chemical, polymer, textile, and pharmaceutical industries. Metals may be recovered from the reaction product. The residual carbonaceous solids and ash minerals in the reaction product may also have value as fertilizer. The ash minerals can also be used as fillers for cement and asphalt, and other such materials.

In some embodiments, the reaction product may optionally be subjected to chemical and/or physical separation. Chemical and/or physical separation may be employed for separation of various components in the reaction product. For example, some high-valued minerals and chemicals may be recovered from the reaction product using conventional chemical and/or physical separation methods. Such high value chemicals include, for example, oxo-chemicals. Applicable chemical and physical separation technologies that may be used include any of those known to one skilled in the art, including fractional distillation, liquid/liquid extraction, adsorption, ion exchange, membrane filtering, and hybrid systems.

In some embodiments, the solid carbonaceous feedstock in the aqueous mixture may not be completely solubilized after the heating step 200. In such embodiments, the remaining solid carbonaceous feedstock in the treated aqueous mixture may be recovered and recycle back to the adsorbing step 100 for further treatment by the present invention.

In some embodiments, the present invention may be accomplished in a single step in a continuous bubble column, plug flow, or auger reactor by directing the incoming air flow into the dense solid-liquid phase of the reactor in a pulse fashion that limits the amount of oxygen dissolved in the liquid phase in the reactor. By doing so, adsorption of oxygen is favored. Further, in this reactor, the water soluble organic molecules can be moved away from the oxygen rich zone by the action of the moving liquid and gas phases.

After extracting the minerals and high-value chemicals, the remainder of the reaction product including water soluble oxidation products, may be subjected to microbial digestion and/or enzymatic digestion 300. In some embodiments, a base may be added to neutralize residual oxidizing acid in the reaction product before microbial digestion 300, if required.

This remainder of the reaction product includes water soluble organic molecules, and possibly some solid high molecular weight carbonaceous materials. These products may be introduced to a microbial digester, where the carbonaceous materials, especially the low-molecular weight water soluble organic molecules undergo a bioconversion process. During the bioconversion process, some, or all, of the water soluble organic molecules are digested by the microorganism(s) in the microbial digester. In one embodiment, the bioconversion process may produce biogases such as methane, hydrogen, carbon monoxide, or other gases and mixtures thereof, which may be used as fuel or can be converted to electricity.

The conditions in the microbial digester should be optimized to achieve a high degree of biodegradation of the carbonaceous materials in the digester, taking into account one or both of the degree and rate of bioconversion. The reaction products obtained from the heating step 200 may affect one or both of the degree and rate of bioconversion in the subsequent bioconversion step. Thus, in one aspect of the invention, the conditions of the heating step 200 are selected on the basis of producing reaction products that include large quantities of biodegradable materials and/or may exhibit an enhanced rate of biodegradation or an enhanced tendency to biodegrade.

The present invention is capable of releasing sugars and polysaccharides from biomass, thus separating cellulose from lignin. In doing so, greater yields can be attained using enzymatic hydrolysis for even greater production of $C_5$ and $C_6$ sugars in a fermentor downstream of heating step 200. Then, naturally occurring microorganisms, genetically engineered microorganisms, or synthetic microorganism consortia can be applied ahead of separation steps in order to convert the produced sugars to specific chemical(s) of interest. These specific chemical(s) of interest include, but are not limited to methanol and higher alcohols, glycerol, lactic acid, propionic acid, malonic acid, succinic acid, fumaric acid, malic acid, acetoin, threonine, serine, 3-hydroxy propionate, aspartic acid, itaconic acid, furfural, levulinic acid, glutamic acid, xylonic acid, xylitol/arabitol, citric/aconitic acid, 5-hydroxymethyl furfural, lysine, gluconic acid, glucaric acid, sorbitol, gallic acid, and ferulic acid, among others.

In some embodiments, the microorganisms are from the genera of *Acetobibrio, Acitothermus, Actinobacillus, Anaerobiospirillum, Anaerocellum, Anaeromyces, Aspergillus, Basfia, Butyrivibrio, Caldicellulosiruptor, Cellulomonas, Cellvibrio, Corynebacterium, Cytophaga, Erwinia, Fibobacter, Fibrobacter, Mannheimia, Neocallimastix, Orpinomyces, Paenibacillus, Pectobacterium, Piromonas, Prevotella, Prevotella, Rhodothermus, Ruminococcus, Ruminococcus, Saccharophagus, Sorangium, Sphaeromonas, Thermobifida, Thermotoga, Wolinella,* and *Zygosaccharomyces*. The microorganisms may be from the order of Actinomycetales, or microorganisms from the family of Pasteurellaceae may be used.

The microbial digester may be either an aerobic digester, an anaerobic digester, or a combination of the two. Aerobic digestion and anaerobic digestion typically provide different products. Thus, aerobic and anaerobic digestion may function complimentarily. The anaerobic digester may be a wastewater treatment system, in which biogas may be recovered for energy efficiency.

In some embodiments, the microbial digester may be a partial anaerobic digester, which may be configured such that only a portion of the microbial digester is exposed to oxygen. At another portion of the microbial digester, the oxygen has been essentially consumed and thus this portion of the microbial digester functions as an anaerobic digester. In this partial anaerobic digester, the carbonaceous materials pass from the aerobic portion to anaerobic portion of the microbial digester such that the carbonaceous materials are subjected to both aerobic digestion and anaerobic digestion. Alternatively, a single microbial digester may be supplied with a limited amount of oxygen. After initial aerobic digestion, the supplied oxygen is essentially consumed at which point the digester becomes an anaerobic digester.

The water soluble organic molecules in the microbial digester may be metabolized using microbes in the form of a single species or strain of a microorganism, multiple species or strains of microorganism or a microorganism consortium. Microbial digestion may be used to produce products of interest, including gases such as methane and hydrogen, liquids such as organic acids and alcohols, and solids such as oxo-aromatics.

Different microorganisms may be employed for different purposes. For example, two or more different reactions may be carried out in a single microbial digester by introduction of different microorganisms. Concentrations of microorganisms may also be varied to alter the relative reaction rates thereby influencing the product mixture, particularly in situations where reactions compete for the same reactants. For example, particular microorganism that is involved in a rate-limiting step of the bioconversion process may be supplemented to increase the reaction rate or yield of that rate-limiting step.

In embodiments employing a microorganism consortium, different species of microorganisms may be provided for different purposes. For example, a particular microorganism can be introduced for the purpose of increasing a nutrient, decreasing a concentration of a toxin, and/or inhibiting a competing microorganism for another microorganism in the consortium that participates in the bioconversion process. One or more species of microorganisms may be introduced to accomplish two or more of these purposes.

The microorganisms may be naturally occurring microorganisms or may be genetically modified from a naturally occurring strain. These microorganisms may include fungi, bacteria, archaea, and combinations thereof. The microorganisms are typically selected based on metabolic pathways that achieve conversion of carbonaceous molecules to specific products of interest.

In some embodiments, at least one nutrient may be introduced to the microbial digester. The nutrients may be substances upon which one or more species of microorganism is dependent or the nutrients may substances that can or will be converted to a substance upon which one or more species of microorganism is dependent. Suitable nutrients for the present invention include ammonium, ascorbic acid, biotin, calcium, calcium pantothenate, chlorine, cobalt, copper, folic acid, iron, $K_2HPO_4$, $KNO_3$, magnesium, manganese, molybdenum, $Na_2HPO_4$, $NaNO_3$, $NH_4Cl$, $NH_4NO_3$, nickel, nicotinic acid, p-aminobenzoic acid, biotin, lipoic acid, mercaptoethanesulfonic acid, nicotinic acid, phosphorus, potassium, pyridoxine HCl, riboflavin, selenium, sodium, thiamine, thioctic acid, tungsten, vitamin B6, vitamin B2, vitamin B1, vitamin B12, vitamin K, yeast extract, zinc and mixtures of one or more of these nutrients.

In some embodiments, at least one enzyme may also be added to the microbial digester. The enzymes can be used, for example, to enhance the conversion of carbonaceous materials in the microbial digester. For example, an enzyme may be used to assist a specific conversion reaction, preferably a rate limiting reaction, in the bioconversion process. In some exemplary embodiments, enzymes may be used to further to enhance the yield, rate and/or selectivity of the bioconversion process, or a substance that inhibits growth of at least one species inhibitory to the yield, rate and/or selectivity of the conversion process.

The enzymes that are suitable for the present invention may include Acetyl xylan esterase, Alcohol oxidases, Allophanate hydrolase, Alpha amylase, Alpha mannosidase, Alpha-L-arabinofuranosidase, Alpha-L-rhamnosidases, Ammoniamonooxygenase, Amylases, Amylo-alpha-1,6-lucosidase, Arylesterase, Bacterial alpha-L-rhamnosidase, Bacterial pullanases, Beta-galactosidase, Beta-glucosidase, Carboxylases, Carboxylesterase, Carboxymuconolactone decarboxylase, Catalases, Catechol dioxygenase, Cellulases, Chitobiase/beta-hexo-aminidase, CO dehydrogenase, CoA ligase, Dexarboxylases, Dienelactone hydrolase, Dioxygenases, Dismutases, Dopa 4,5-dioxygenase, Esterases, Family 4 glycosylhydrolases, Glucanaeses, Glucodextranases, Glucosidases, Glutathione S-transferase, Glycosyl hydrolases, Hyaluronidases, Hydratases/decarboxylases, Hydrogenases, Hydrolases, Isoamylases, Laccases, Levansucrases/Invertases, Mandelate racemases, Mannosyl oligosaccharide glucosidases, Melibiases, Methanomicrobialesopterin S-methyltransferases, Methenyl tetrahydromethanopterin cyclohydrolases, Methyl-coenzyme M reductase, Methylmuconolactone methyl-isomerase, Monooxygenases, Muconolactone delta-isomerase, Nitrogenases, O-methyltransferases, Oxidases, Oxidoreductases, Oxygenases, Pectinesterases, Periplasmic pectate lyase, Peroxidases, Phenol hydroxylase, Phenol oxidases, Phenolic acid decarboxylase, Phytanoyl-CoA dioxygenase, Polysaccharide deacetylase, Pullanases, Reductases, Tetrahydromethan-opterin S-methyltransferase, *Thermotoga* glucanotransferase and Tryptophan 2,3-dioxygenase.

In some embodiments, the products of heating step 200 may be subjected to enzymatic digestion 300, since heating step 200 may make the carbonaceous feedstock more vulnerable to certain enzymes. It is believed that the heating step 200 can remove a significant portion of lignin from the lignocellulosic biomass, thus exposing the cellulose and hemicellulose for enzymatic digestion 300. Enzymes that may be used include xylanase, cellulase, hemicellulase, ligninase, pectinase, and combinations thereof. The cellulase may be selected from a mannan endo-1,4-P-mannosidase, 1,3-p-D-glucan glucanohydrolase, 1,3-β-glucan glucohydrolase, 1,3-1,4-p-D-glucan glucanohydrolase, and 1,4-β-D-glucan glucanohydrolase.

The hemicellulase may be selected from a-L-arabinofuranosidase, a-glucuronidase, acetyl mannan esterase, acetyl xylan esterase, a-galactosidase, β-glucosidase, P-1,4-xylosidase, endo-galactanase, endo-P-1,4-mannanase, endo-a-1,5-arabinanase, exo-P-1,4-mannosidase, exo-p-1,4-xylosidase, feruloyl esterase, ferulic acid esterase, p-cumaric acid esterase, glucuronoxylan xylanohydrolase and xyloglucan endotransglycosylase.

The ligninase may be selected from diarylpropane peroxidase, glucose oxidase, glyoxal oxidase, lignin peroxidase, manganese peroxidase, methanol oxidase, methanol oxidoreductase, phenol oxidase, phenol peroxidase, or veratryl alcohol oxidase. The pectinase may be a pectolyase, pectozyme and polygalacturonase.

Other enzymes that may be used in the enzymatic digestion 300 include acetyl xylan esterase, alcohol oxidases, allophanate hydrolase, alpha amylase, alpha mannosidase, alpha-1-arabinofuranosidase, alpha-1-rhamnosidases, ammoniamonooxygenase, amylases, amylo-alpha-1,6-lucosidase, arylesterase, bacterial alpha-1-rhamnosidase, bacterial pullanases, beta-galactosidase, beta-glucosidase, carboxylases, carboxylesterase, carboxymuconolactone decarboxylase, catalases, catechol dioxygenase, cellulases, chitobiase/beta-hexo-aminidase, CO dehydrogenase, CoA ligase, dexarboxylases, dienelactone hydrolase, dioxygenases, dismutases, dopa 4,5-dioxygenase, esterases, family 4 glycosylhydrolases, glucanaeses, glucodextranases, glucosidases, glutathione s-transferase, glycosyl hydrolases, hyaluronidases, hydratases/decarboxylases, hydrogenases, hydrolases, isoamylases, laccases, levansucrases/invertases, mandelate racemases, mannosyl oligosaccharide glucosidases, melibiases, methanomicrobialesopterin S-methyltransferases, methenyl tetrahydro-methanopterin cyclohydrolases, methyl-coenzyme M reductase, methylmuconolactone methyl-isomerase, monooxygenases, muconolactone delta-isomerase, nitrogenases, o-methyltransferases, oxidases, oxidoreductases, oxygenases, pectinesterases, periplasmic pectate lyase, peroxidases, phenol hydroxylase, phenol oxidases, phenolic acid decarboxylase, phytanoyl-coa dioxygenase, polysaccharide deacetylase, pullanases, reductases, tetrahydromethan-opterin s-methyltransferase, *thermotoga* glucanotransferase and tryptophan 2,3-dioxygenase.

The paper industry uses cellulose fibers to make paper. Thus, to provide a raw material stream for the paper industry lignin and, to some extent, hemicellulose, can be separated from the cellulose in lignocellulosic biomass.

Using the process of the invention, a significant amount of lignin in biomass is converted to organic acids and a significant amount of hemicellulose in biomass is converted to sugars, while only a minimal amount of cellulose fibers are affected by the process. In some embodiments of the invention only about 2-3% of the cellulose in the biomass is affected by the oxidation step. Thus the cellulose fibers typically remain as a solid at the end of heating step 200. The present invention uses the process described herein to depolymerize most of the lignin and a significant amount of hemicellulose in the lignocellulosic biomass, thus providing a product from which a component containing a large proportion of cellulose fibers can be obtained. The obtained cellulose fibers are substantially free of lignin making them attractive as a raw material for the paper industry or any other industries where cellulose fibers may be used. It should be emphasized that the process of the invention is clean, involves relatively low energy costs and does not employ harsh or toxic chemicals, when compared with the pulping techniques that are frequently used in the paper industry.

Figure 4:
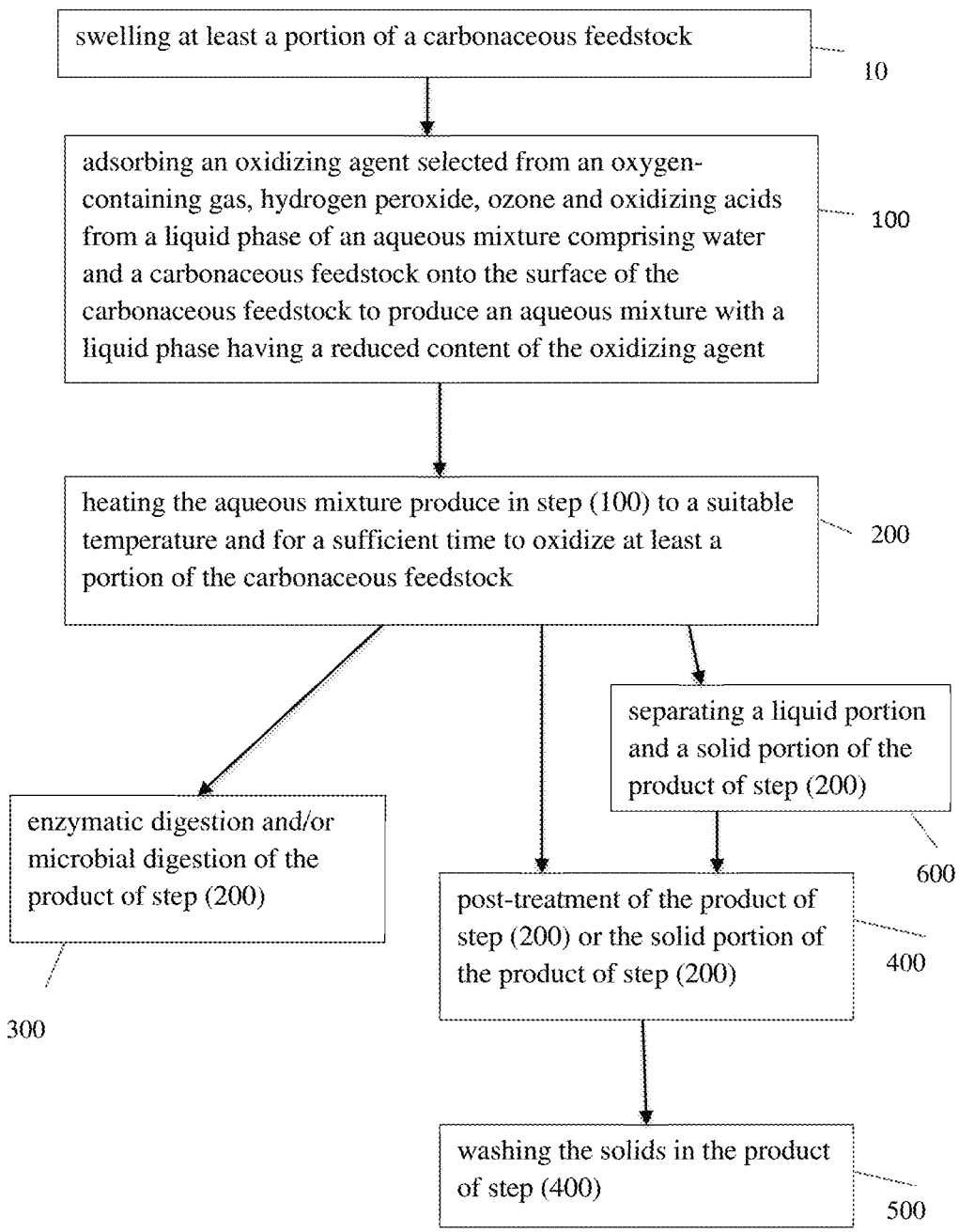
FIG. 4 shows a flow chart of a process for generating cellulose materials from biomass according to one embodiment of the invention.

Referring to FIG. 4, the process further comprises steps for separating the solid component containing the cellulose fibers from the product of the heating step 200. In some embodiments, the product of heating step 200 may be subjected to post-treatment 400 to either reduce the size of solids remaining in the product, or to soften at least some of the solids. Common techniques that may be used in the post-treatment include steam explosion, ball milling, hammer milling, grinding, refining, compression milling, impact milling, mechanical ripping or tearing, pin grinding air attrition milling and mechanical pulping. The solids are predominantly cellulose fibers (both crystalline fibers and amorphous fibers). This post treatment may convert a portion of the crystalline cellulose fibers to amorphous cellulose fibers.

A person skilled in the art may appreciate that the severity of mechanical treatment may need to be tempered to ensure that the cellulose fibers remaining after the mechanical treatment step are not too short. Mechanical treatment may break, in addition to separating, the cellulose fibers. Routine experimentation may be employed to optimize the length and/or severity of a particular mechanical treatment step based on the length of the resultant cellulose fibers.

In one embodiment, the solid and liquid portions of the product of the heating step 200 may be separated 600 (FIG. 4). The liquid portion may then be subjected to further microbial fermentation, further separation and/or all or a portion of the liquid portion may be recycled. The solid portion may be subjected to the post-treatment described above to reduce the size of the solids, or to soften the solids.

Steam explosion can break down the structure of the solids, at least in part, by applying steam of high pressure to first heat and pressurize any gases and fluids present inside the solids and subsequently explode the structure of the solids via a rapid depressurization of the solids, to provide solids which have an increased moisture content. For steam explosion, the product of heating step 200, or solids separated therefrom, is placed in the sealed vessel, which has a small opening and is initially maintained at around atmospheric pressure. High pressure steam is introduced into the vessel through the opening. In a later stage, the pressure in the vessel is rapidly dropped to atmospheric pressure by letting out the steam, which causes an internal "explosion," i.e., rapid expansion of steam upon the drop in pressure or due to the "flashing" of liquid water to vapor upon the drop in pressure. The steam explosion process is described in more detail in US 20130341569, which is hereby incorporated herein by reference.

Mechanical pulping is a common technique used in the paper industry. The various mechanical pulping methods, such as groundwood (GW) and refiner mechanical (RMP) pulping, physically tear the cellulose fibers one from another. More detailed information on making pulp can be found in Rydholm, 1985, Pulping Process, John Wiley & Sons Inc., ISBN 9780471747932.

Referring to FIG. 4, the remaining solids after the post-treatment 400 may be filtered and washed 500 with, for example, water to remove non-cellulose components. After the washing step 500, a substantial proportion of the non-cellulose components has been removed from the cellulose fibers. The washed cellulose may be dried for use as a raw material in the paper industry to make paper or for use in other industries to make cellulose fiber-based products. It is believed that washing may also break some hydrogen bonds, thereby removing some additional non-cellulose components.

Further, water soluble organic acids may be separate from the liquid portion of the product of heating step 200, or a liquid portion of the product after post-treatment 400. The heating step 200 can produce both sugars (mostly from the hemicellulose in the lignocellulosic biomass) and small organic acids that are water soluble (mostly from the lignin in the lignocellulosic biomass). The organic acids, after separation from the liquid, can be recycled to the adsorbing step 100 and/or heating step 200 and/or swelling step 10. This is another advantage of the present invention since the organic acids can be reused for the depolymerization and solubilization. Thus, there is a reduced need or no need to add organic acids/bases and/or catalysts to the process.

Any suitable separation techniques known to those skilled in the art can be used to separate the organic acids from the liquid portion. Such techniques may include liquid-liquid extraction, gas stripping, steam stripping, distillation and the like. The organic acids can then be captured in a condenser, purified in a purifier, and stored in a storage container. The organic acids can be recycled back to adsorbing step 100 and/or heating step 200 and/or swelling step 10, as described above. It is noted that the organic acids may also be used in a variety of applications, including synthesis of polymers, pharmaceuticals, and the production of chemical commodities such as methyltetrahydrofuran, valerolactone, and ethyl levulinate.

The present invention is distinguishable from the prior known methods by virtue of the adsorbtion of an oxidizing agent such as oxygen onto the lignocellulosic biomass. Prior methods for hydrolysis of lignocellulosic biomass used steam to flush out air, especially oxygen, from the biomass in a pretreatment, which is contrary to the finding of the present invention where oxidizing agent (including oxygen-containing air or oxygen-enriched air) are purposely introduced to the biomass to be adsorbed into the biomass for use in a subsequent step that preferentially depolymerizes the lignocellulosic biomass, especially the lignin and hemicellulose components of the lignocellulosic biomass. A further advantage of the present invention is that during the preferential depolymerization of lignin and hemicellulose in the lignocellulosic biomass, only a small amount (e.g. 2-3 wt. %) of cellulose fibers in the lignocellulosic biomass are depolymerized.

EXAMPLES

The following examples are illustrative, but not limiting, of the methods of the present disclosure. Other suitable modifications and adaptations of the variety of conditions and parameters normally encountered in the field, and which are obvious to those skilled in the art, are within the scope of the disclosure.

Example 1

About 1.6 kg of low rank coal (lignite), 3.2 kg of water and 15 kg of ¾" stainless steel balls were charged into a 10 L rotating jar and milled for 1.5 hours. The resulting slurry, with a median particle size of about 15μ, was then diluted to about a 22% solids content. Using a progressive cavity pump, the slurry was fed continuously at a rate of 33.4 g/min into a 2 L pre-adsorption stirred tank at a pressure of 550 psig and at 25° C. Compressed air was also fed into this tank at a rate of 2.0 slpm. The outlet stream from this tank was then fed into a 3-phase bubble column reactor (BCR) which was 5 cm in diameter and 125 cm in height. An additional compressed air flow rate of 13.4 slpm was provided for fluidization through a sintered metal sparger in this reactor. The reactor was operated at 550 psig and a uniform temperature of 180° C. Once the reactor was at steady state, the gaseous and liquid products were collected at equal time intervals and were analyzed using appropriate analytical techniques.

Examples 2-4

Example 1 was repeated under the same conditions but the temperature of the adsorption stirred tank was raised to 53° C., 82° C. and 110° C., respectively. The results of all four experiments, in comparison to an experiment with no adsorption, are shown in Table 1 and FIG. 2.

TABLE 1

Conversion of carbon in coal to organic acids

| Experiment | C to Acetaldehyde | C to Acetate | C to Acetone | C to Formate | C to Malonate | C to Oxalate | C to Succinate |
|---|---|---|---|---|---|---|---|
| No adsorption | 0.14% | 0.93% | 0.25% | 0.47% | 0.02% | 0.02% | 0.11% |
| Example 1 Adsorption@25° C. | 0.24% | 0.88% | 0.43% | 0.52% | 0.03% | 0.01% | 0.12% |
| Example 2 Adsorption@53° C. | 0.19% | 1.04% | 0.36% | 0.58% | 0.03% | 0.02% | 0.13% |
| Example 3 Adsorption@82° C. | 0.15% | 1.00% | 0.34% | 0.59% | 0.04% | 0.02% | 0.14% |
| Example 4 Adsorption@110° C. | 0.21% | 0.97% | 0.31% | 0.55% | 0.03% | 0.02% | 0.13% |

Figure 2:
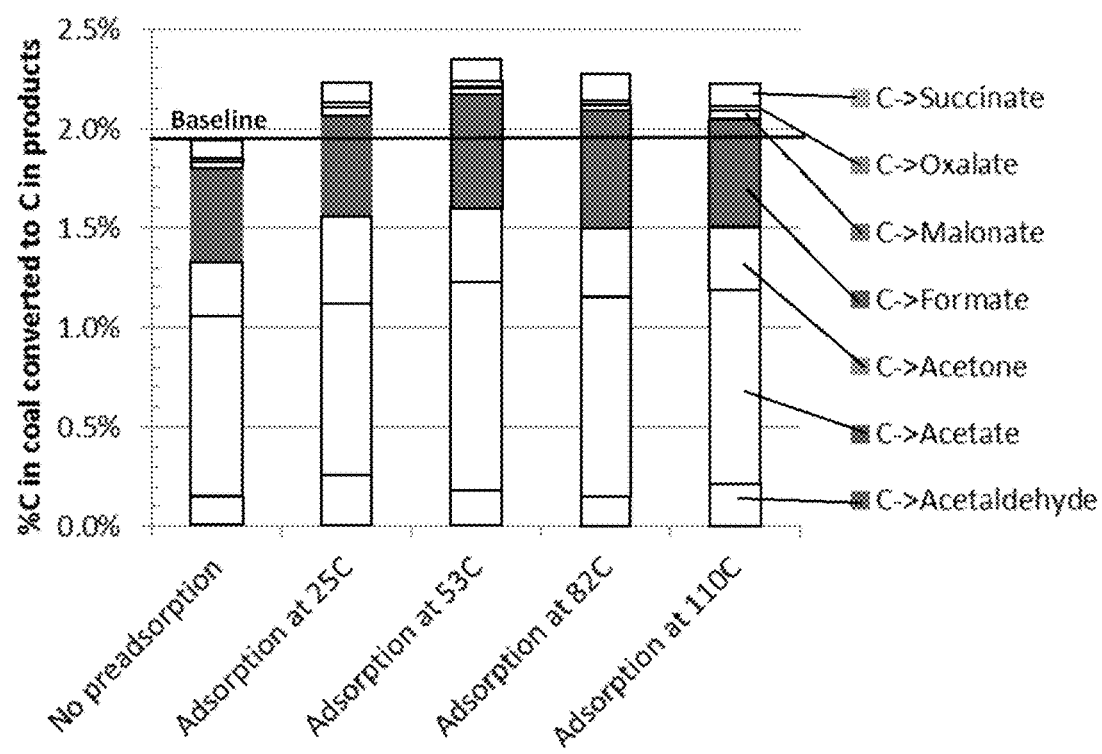
FIG. 2 shows a diagram of conversion of coal to valuable organic compounds (per gram of coal) as produced in Example 1.

The results show that the adsorption step carried out at all 4 temperatures caused an improvement in product yields with the 53° C. adsorption step resulting in the highest improvement which amounted to about a 21% increase over the baseline (no adsorption, see FIG. 2). Total liquid products (dissolved organic compounds) as well as $CO_2$ were also measured and are presented in Table 2.

TABLE 2

Conversion of carbon in coal to liquid products or $CO_2$

| Experiment | C to liquids | C to CO2 |
|---|---|---|
| No adsorption | 1.5% | 17.8% |
| Example 1 Adsorption at 25° C. | 2.6% | 17.1% |
| Example 2 Adsorption at 53° C. | 2.9% | 16.5% |
| Example 3 Adsorption at 82° C. | 2.9% | 20.4% |
| Example 4 Adsorption at 110° C. | 2.4% | 16.8% |

Referring to FIG. 3, the total conversion also showed an improvement in the yield of liquid products over the baseline which was conducted without an adsorption step. Again, in the case of a 53° C. adsorption temperature, the increase in yield amounted to about 93%. It was clearly shown that the adsorption step, in which oxygen was selectively directed to interact with the solid coal particles, was beneficial and improved the yields of valuable oxo-chemical products such as carboxylic acids, acetone and acetaldehyde.

Examples 5-6

Biomasses A & B, sugarcane bagasse and Douglas Fir, respectively, were ground to a top size of 2.5 cm and were mixed with water at a concentration of about 7%. The slurry produced was then fed to a continuous stirred tank reactor (CSTR) operated in a batch mode. $O_2$ was introduced to the CSTR via pressurization of the headspace with compressed air or $O_2$-enriched air. The temperature, heating rate, hold time, pressure, and stirring rate of both the adsorbing 100 and heating steps 200 were adjusted to achieve a high yield of fermentable sugars. The adsorbing step, in which $O_2$ diffused through the liquid phase and adsorbed on the surface of the biomass, proved to be important for maximizing the conversion of biomass while reducing the secondary reactions by reducing the $O_2$ concentration in the liquid phase. This may allow higher reaction temperatures. The results, in terms of biomass carbon conversion, are shown in Table 3 below:

TABLE 3

Conversion of biomass to organic compounds
Biomass carbon conversion to carbon in products

| Liquid Products | Biomass A (Example 5) | Biomass B (Example 6) |
|---|---|---|
| Formate | 2.2% | 3.2% |
| Acetate | 2.9% | 1.6% |
| Oxalate | 0.5% | 0.4% |
| Succinate | 0.1% | 0.0% |
| Pyruvate | 0.8% | 0.4% |
| Xylose | 7.6% | 5.3% |
| Arabinose | 1.5% | 0.4% |
| Glucose | 0.5% | 1.4% |
| Acetaldehyde | 0.1% | 0.1% |
| Acetone | 0.1% | 0.1% |
| Carbon in organic liquids | 29.4% | 22.8% |
| Carbon dioxide | 6.5% | 5.6% |
| Carbon in solids | 64.1% | 71.6% |

These results showed that by utilizing an adsorbing step before depolymerizing the carbonaceous materials, significantly higher yields of $C_5$ and $C_6$ sugars can be achieved even without using severe reaction conditions and without using costly acids, bases or other reagents. Furthermore, the unconverted solids from this process contained modified cellulose and lignin (according to spectroscopic data) which are more accessible for enzymatic hydrolysis and will result in a higher total sugar yield.

Example 7

Several samples of biomass, including the biomass obtained from Douglas Fir, used in Example 6, as well as biomass obtained from Guayule, corn stover, yellow pine, Douglas fir, palm fruit empty bunches, poplar and switch grass, were processed following the same procedure as in Example 6. After the heating step, the solids were analyzed to measure the portion of cellulosic fiber that was depolymerized by the adsorbed oxygen. All samples showed that less than 2% of the cellulosic fibers in the initial biomass were converted to glucose. Thus, at least 98% of the cellulosic fibers in the biomass remained as solid fibers after the heating step. Thus, most of cellulosic fibers from the initial biomass may be harvested from the product of the heating step for use in paper making.

Other embodiments of the present disclosure will be apparent to those skilled in the art from consideration of the specification and practice of the embodiments disclosed herein. It is intended that the specification and examples be considered as exemplary only, with a true scope of the disclosure being indicated by the following claims.

The foregoing embodiments are susceptible to considerable variation in practice. Accordingly, the embodiments are not intended to be limited to the specific exemplifications set forth herein. Rather, the foregoing embodiments are within the spirit and scope of the appended claims, including the equivalents thereof available as a matter of law.

All documents mentioned herein are hereby incorporated by reference in their entirety or alternatively to provide the disclosure for which they were specifically relied upon.

The applicant(s) do not intend to dedicate any disclosed embodiments to the public, and to the extent any disclosed modifications or alterations may not literally fall within the scope of the claims, they are considered to be part hereof under the doctrine of equivalents.

What is claimed is:

1. A method for treating a lignocellulosic biomass, comprising the steps of:
   swelling (10) the lignocellulosic biomass with water and/or steam in the presence of a chemical base;
   adsorbing (100), after the swelling step (10), at least one oxidizing agent selected from an oxygen-containing gas, hydrogen peroxide, ozone and oxidizing acids from a liquid phase of an aqueous mixture comprising water, at least one oxidizing agent and the lignocellulosic biomass, onto the lignocellulosic biomass under conditions at which substantially no oxidative depolymerization of carbonaceous materials of the lignocellulosic biomass will occur in order to produce an aqueous mixture with the liquid phase having a reduced content of the oxidizing agent and lignocellulosic biomass having oxidizing agent adsorbed on a surface thereof; and
   heating (200) the aqueous mixture produced in the adsorbing step (100) to a temperature and a sufficient time to oxidatively depolymerize and solubilize at least a portion of the lignocellulosic biomass.

2. The method of claim 1, wherein the swelling step (10) is carried out at a temperature in a range of from about 25° C. to about 100° C. and under a pressure of less than about 30 psi.

3. The method of claim 1, wherein the adsorbing step (100) is carried out a temperature below about 220° C. for a period of less than about 1 hour.

4. The method of claim 1, wherein the products of the heating step (200) have an oxygen to carbon molar ratio that is from 30% to 200% higher than an oxygen to carbon molar ratio of the lignocellulosic biomass.

5. The method of claim 1, wherein the adsorbing step (100) is conducted at a pressure greater than a pressure in the heating step (200).

6. The method of claim 5, wherein the pressure in the heating step (200) is in a range of 10-1230 psig.

7. A method for treating a lignocellulosic biomass, comprising the steps of:
   swelling (10) the lignocellulosic biomass with water and/or steam concurrently with adsorbing (100) at least one oxidizing agent selected from an oxygen-containing gas, hydrogen peroxide, ozone and oxidizing acids from a liquid phase of an aqueous mixture comprising water, at least one oxidizing agent and the lignocellulosic biomass, onto the lignocellulosic biomass under conditions at which substantially no oxidative depolymerization of carbonaceous materials of the lignocellulosic biomass will occur in order to produce an aqueous mixture with the liquid phase having a reduced content of the oxidizing agent and lignocellulosic biomass having oxidizing agent adsorbed on a surface thereof; and heating (200) the aqueous mixture produced in the adsorbing step (100) to a temperature and for a sufficient time to oxidatively depolymerize and solubilize at least a portion of the lignocellulosic biomass.

8. The method of claim 7, wherein the swelling step (10) is carried out at a temperature in a range of from about 25° C. to about 100° C. and under a pressure less than about 30 psi.

9. The method of claim 7, wherein the swelling step (10) is carried out with addition of a chemical base.

10. The method of claim 7, wherein the adsorbing step (100) is carried out a temperature below about 220° C. for a period of less than about 1 hour.

11. The method of claim 7, wherein the products of the heating step (200) have an oxygen to carbon molar ratio that is from 30% to 200% higher than an oxygen to carbon molar ratio of the lignocellulosic biomass.

12. The method of claim 7, wherein the adsorbing step (100) is conducted at a pressure greater than a pressure in the heating step (200).

13. The method of claim 12, wherein the pressure in the heating step (200) is in a range of 10-1230 psig.

14. A method for treating a lignocellulosic biomass, comprising the steps of:

adsorbing (100) at least one oxidizing agent selected from an oxygen-containing gas, hydrogen peroxide, ozone and oxidizing acids from a liquid phase of an aqueous mixture comprising water, at least one oxidizing agent and the lignocellulosic biomass, onto the lignocellulosic biomass under conditions at which substantially no oxidative depolymerization of carbonaceous materials of the lignocellulosic biomass will occur in order to produce an aqueous mixture with the liquid phase having a reduced content of the oxidizing agent and lignocellulosic biomass having oxidizing agent adsorbed on a surface thereof;

heating (200) the aqueous mixture produced in the adsorbing step (100) to a temperature and for a sufficient time to oxidatively depolymerize and solubilize at least a portion of the lignocellulosic biomass to produce a water soluble product and a water insoluble product; and enzymatically digesting (300) at least one of the water soluble product and the water insoluble product.

15. The method of claim 14, further comprising a step of microbial digestion of one or more products of the enzymatic digestion step (300).

16. The method of claim 15, where the step of microbial digestion produces a biofuel or biogas.

17. The method of claim 15, where the step of microbial digestion produces a growth of bacterial cells or fungal cells.

18. The method of claim 15, where the microbial digestion step uses a genetically modified microbe.

19. The method of claim 15, where microbial digestion step uses a group of microbes.

20. The method of claim 15, further comprising a step of making a soil enhancing fertilizer from solid residual byproducts and ash minerals remaining after the microbial digestion step.

21. The method of claim 14, wherein the adsorbing step (100) is carried out a temperature below about 220° C. for a period of less than about 1 hour.

22. The method of claim 14, wherein the products of the heating step (200) have an oxygen to carbon molar ratio that is from 30% to 200% higher than an oxygen to carbon molar ratio of the lignocellulosic biomass.

23. The method of claim 14, wherein the adsorbing step (100) is conducted at a pressure greater than a pressure in the heating step (200).

24. The method of claim 23, wherein the pressure in the heating step (200) is in a range of 10-1230 psig.

\* \* \* \* \*